(12) United States Patent
De Ren et al.

(10) Patent No.: US 11,578,278 B2
(45) Date of Patent: Feb. 14, 2023

(54) RENEWABLE TRANSPORTATION FUEL PROCESS WITH THERMAL OXIDATION SYSTEM

(71) Applicant: Honeywell International Inc., Charlotte, NC (US)

(72) Inventors: Jan De Ren, Bracknell (GB); Xin X. Zhu, Long Grove, IL (US)

(73) Assignee: Honeywell International Inc., Charlotte, NC (US)

( * ) Notice: Subject to any disclaimer, the term of this patent is extended or adjusted under 35 U.S.C. 154(b) by 37 days.

(21) Appl. No.: 17/361,680

(22) Filed: Jun. 29, 2021

(65) Prior Publication Data

US 2022/0033722 A1 Feb. 3, 2022

Related U.S. Application Data

(60) Provisional application No. 63/155,465, filed on Mar. 2, 2021, provisional application No. 63/065,639, filed
(Continued)

(51) Int. Cl.
*C10G 67/02* (2006.01)
*C10G 3/00* (2006.01)
(Continued)

(52) U.S. Cl.
CPC ............ *C10G 67/02* (2013.01); *B01D 3/143* (2013.01); *B01D 5/0063* (2013.01); *B01D 5/0072* (2013.01); *B01D 5/0075* (2013.01); *B01D 53/047* (2013.01); *B01D 53/1425* (2013.01); *B01D 53/1481* (2013.01); *B01D 53/1493* (2013.01); *B01D 53/343* (2013.01); *B01D 53/502* (2013.01); *B01D 53/56* (2013.01); *B01D 53/68* (2013.01); *B01D 53/72* (2013.01); *B01D 53/78* (2013.01); *B01D 53/96* (2013.01);
(Continued)

(58) Field of Classification Search
None
See application file for complete search history.

(56) References Cited

U.S. PATENT DOCUMENTS 2,722,547 A * 11/1955 Toland, Jr. ............... C07C 63/00
562/548
2,881,047 A * 4/1959 Townsend ................ C10K 1/16
423/575
(Continued)

FOREIGN PATENT DOCUMENTS

CA 2706957 A1 6/2009
CN 101239758 A 8/2008
(Continued)

OTHER PUBLICATIONS

International Search Report from corresponding PCT application No. PCT/US2021/071066, dated Nov. 3, 2021.
(Continued)

*Primary Examiner* — Tam M Nguyen

(57) ABSTRACT

A process for treating effluent streams in a renewable transportation fuel production process is described. One or more of the sour water stream and an acid gas stream are treated directly in thermal oxidation section. The process allows the elimination or size reduction of a sour water stripper unit, waste water treatment plant, and sulfur recovery unit.

20 Claims, 12 Drawing Sheets

Related U.S. Application Data on Aug. 14, 2020, provisional application No. 63/060,031, filed on Aug. 1, 2020.

(51) Int. Cl.

| | | |
|---|---|---|
| *C10L 1/04* | (2006.01) | |
| *B01D 53/14* | (2006.01) | |
| *B01D 53/34* | (2006.01) | |
| *B01D 53/50* | (2006.01) | |
| *B01D 53/68* | (2006.01) | |
| *B01D 53/78* | (2006.01) | |
| *B01D 53/56* | (2006.01) | |
| *B01D 53/72* | (2006.01) | |
| *B01D 53/96* | (2006.01) | |
| *B01D 5/00* | (2006.01) | |
| *B01D 53/047* | (2006.01) | |
| *B01D 3/14* | (2006.01) | |
| *C02F 1/72* | (2006.01) | |
| *C02F 1/16* | (2006.01) | |
| *C10G 1/00* | (2006.01) | |

(52) U.S. Cl.
CPC ............... *C02F 1/16* (2013.01); *C02F 1/72* (2013.01); *C10G 1/002* (2013.01); *C10G 3/50* (2013.01); *C10L 1/04* (2013.01); *B01D 2251/304* (2013.01); *B01D 2251/402* (2013.01); *B01D 2251/404* (2013.01); *B01D 2252/102* (2013.01); *B01D 2257/2025* (2013.01); *B01D 2257/2045* (2013.01); *B01D 2257/302* (2013.01); *B01D 2257/404* (2013.01); *B01D 2257/70* (2013.01); *C10G 2300/1011* (2013.01); *C10L 2200/0469* (2013.01); *C10L 2290/06* (2013.01); *C10L 2290/30* (2013.01); *C10L 2290/541* (2013.01); *C10L 2290/545* (2013.01)

(56) References Cited

U.S. PATENT DOCUMENTS

| | | | |
|---|---|---|---|
| 3,003,955 A * | 10/1961 | Jones | .................... C23F 11/143 |
| | | | 507/939 |
| 3,066,097 A * | 11/1962 | Jones | ..................... C23F 11/10 |
| | | | 507/263 |
| 3,567,433 A | 3/1971 | Gutnikov | |
| 3,728,325 A * | 4/1973 | Carlson et al. | ....... C08F 136/08 |
| | | | 502/103 |
| 4,377,470 A | 3/1983 | Hettinger, Jr. et al. | |
| 4,430,517 A | 2/1984 | Imai et al. | |
| 4,514,368 A | 4/1985 | Hubred | |
| 4,543,245 A * | 9/1985 | Peterman | ............ C01B 17/0417 |
| | | | 423/574.1 |
| 4,544,533 A | 10/1985 | Marcantonio | |
| 4,762,812 A | 8/1988 | Lopez et al. | |
| 5,339,755 A | 8/1994 | Smith | |
| 5,365,010 A | 11/1994 | Rao et al. | |
| 6,449,954 B2 | 9/2002 | Bachmann | |
| 6,514,904 B1 | 2/2003 | Moser et al. | |
| 7,002,048 B2 | 2/2006 | Wijesekera et al. | |
| 7,034,192 B2 | 4/2006 | Wijesekera | |
| 7,126,029 B2 | 10/2006 | Skipworth et al. | |
| 7,141,700 B1 | 11/2006 | Schmidt et al. | |
| 7,141,701 B1 | 11/2006 | Schmidt et al. | |
| 7,166,752 B2 | 1/2007 | Marshall, Jr. et al. | |
| 7,186,866 B1 | 3/2007 | Keenan et al. | |
| 7,417,003 B2 | 8/2008 | Schmidt et al. | |
| 7,674,739 B2 | 3/2010 | Elomari et al. | |
| 7,652,181 B1 | 4/2010 | Schmidt et al. | |
| 7,700,511 B2 | 4/2010 | Reynolds et al. | |
| 7,740,751 B2 | 6/2010 | Peters | |
| 7,744,828 B2 | 6/2010 | Schmidt et al. | |
| 7,841,807 B2 | 11/2010 | Naunheimer et al. | |
| 7,878,736 B2 | 2/2011 | Naunheimer et al. | |
| 7,888,537 B2 | 2/2011 | Schmidt et al. | |
| 8,242,320 B2 | 8/2012 | Schmidt | |
| 8,329,603 B2 | 12/2012 | Randolph et al. | |
| 8,387,645 B2 | 3/2013 | Shafe | |
| 8,457,278 B2 | 6/2013 | Fadler | |
| 8,518,847 B2 | 8/2013 | Jan et al. | |
| 8,608,941 B2 | 12/2013 | Haizmann et al. | |
| 8,609,915 B2 | 12/2013 | Majumder et al. | |
| 8,609,916 B2 | 12/2013 | Majumder et al. | |
| 8,679,321 B2 | 3/2014 | Negiz et al. | |
| 8,853,481 B2 | 10/2014 | Jan et al. | |
| 9,006,123 B2 | 4/2015 | Nabozny | |
| 9,079,816 B2 | 7/2015 | Johnson et al. | |
| 9,138,738 B1 | 9/2015 | Glover et al. | |
| 9,150,469 B2 | 10/2015 | Bullen et al. | |
| 9,181,150 B1 | 11/2015 | Smith et al. | |
| 9,206,362 B2 | 12/2015 | Haizmann et al. | |
| 9,290,826 B2 | 3/2016 | Da Costa et al. | |
| 9,302,951 B2 | 4/2016 | Stevens et al. | |
| 9,321,783 B2 | 4/2016 | Ibert et al. | |
| 9,327,259 B2 | 5/2016 | Hartman et al. | |
| 9,328,037 B2 | 5/2016 | Riley et al. | |
| 9,359,917 B2 | 6/2016 | Koseoglu et al. | |
| 9,360,252 B2 | 6/2016 | Furlong et al. | |
| 9,399,604 B2 | 7/2016 | Martins et al. | |
| 9,416,321 B2 | 8/2016 | Eizenga et al. | |
| 9,469,818 B2 | 10/2016 | Baldriaghi et al. | |
| 9,523,050 B2 | 12/2016 | Pandranki et al. | |
| 9,567,264 B2 | 2/2017 | Fichtl | |
| 9,637,699 B2 | 5/2017 | Ellig et al. | |
| 9,718,047 B2 | 8/2017 | Moser et al. | |
| 9,745,523 B2 | 8/2017 | Ganguly et al. | |
| 9,815,756 B2 | 11/2017 | Schmidt et al. | |
| 9,822,314 B2 | 11/2017 | Ray | |
| 9,914,675 B2 | 3/2018 | Buchbinder et al. | |
| 9,914,880 B2 | 3/2018 | Fichtl et al. | |
| 9,914,883 B2 | 3/2018 | Dutta et al. | |
| 10,041,004 B2 | 8/2018 | Govindhakannan et al. | |
| 10,240,099 B2 | 3/2019 | Mani et al. | |
| 10,384,186 B2 | 8/2019 | Egolf et al. | |
| 10,399,852 B2 | 9/2019 | De Ren et al. | |
| 10,429,066 B2 | 10/2019 | Schröter et al. | |
| 10,577,539 B2 | 3/2020 | Brodeur-Campbell et al. | |
| 10,577,547 B2 | 3/2020 | Wexler et al. | |
| 2003/0194366 A1 * | 10/2003 | Srinivas | ............... B01J 23/8877 |
| | | | 422/177 |
| 2005/0172807 A1 | 8/2005 | Mak | |
| 2006/0096163 A1 | 5/2006 | Dickinson et al. | |
| 2011/0094150 A1 * | 4/2011 | Hunt | ......................... C10L 9/08 |
| | | | 44/626 |
| 2013/0087481 A1 | 4/2013 | Heraud et al. | |
| 2014/0134096 A1 * | 5/2014 | Angelini | ............. C01B 17/0408 |
| | | | 423/576.8 |
| 2014/0374659 A1 * | 12/2014 | Molinari | ............. C01B 17/0495 |
| | | | 252/372 |
| 2015/0094486 A1 | 4/2015 | Buchbinder et al. | |
| 2016/0168054 A1 | 6/2016 | Kalnes et al. | |
| 2017/0044015 A1 * | 2/2017 | Rameshni | ............. C01B 17/164 |
| 2019/0144766 A1 | 5/2019 | Yokomizo et al. | |
| 2019/0292949 A1 | 9/2019 | Sonnek et al. | |
| 2020/0222851 A1 | 7/2020 | De Ren et al. | |

FOREIGN PATENT DOCUMENTS

| | | |
|---|---|---|
| EA | 009089 B1 | 10/2007 |
| EP | 0320094 A | 6/1989 |
| EP | 1218890 A2 | 7/2002 |
| WO | 2012084480 A1 | 6/2012 |
| WO | 2016004473 A1 | 1/2016 |

OTHER PUBLICATIONS

Written Opinion from corresponding PCT application No. PCT/US2021/071066, dated Nov. 3, 2021.
Levy, Edward et al., Recovery of Water from Boiler Flue Gas Using Condensing Heat Exchangers, Final Technical Report issued Jun. 2011, Energy Research Center.

(56) References Cited

OTHER PUBLICATIONS

Liu, Xinpeng et al, Desulfurization and regeneration performance of heteropoly compound/ionic liquid solutions at high temperature, Chemical Engineering Journal 316, 2017, 171-178.

* cited by examiner

RENEWABLE TRANSPORTATION FUEL PROCESS WITH THERMAL OXIDATION SYSTEM

RELATED APPLICATIONS

This application claims the benefit of U.S. Provisional Patent Application Ser. Nos. 63/060,031 filed on Aug. 1, 2020, 63/065,639 filed Aug. 14, 2020, and 63/155,465 filed Mar. 2, 2021, the entirety of which are incorporated herein by reference.

BACKGROUND

As the demand for diesel and jet boiling range fuel increases worldwide, there is increasing interest in feedstock sources other than petroleum crude oil. One such source is what has been termed "renewable" and "biological" feedstocks. These renewable biological feedstocks include, but are not limited to, plant oils such as corn, jatropha, camelina, rapeseed, canola, and soybean oil, algal oils, and animal fats such as tallow and fish oils. The common feature of these sources is that they are composed of glycerides and Free Fatty Acids (FFAs). Both of these classes of compounds contain normal aliphatic carbon chains having from about 8 to about 24 carbon atoms. The aliphatic carbon chains in the glycerides or FFAs can be fully saturated or mono, di- or poly-unsaturated. The sidechains of the glycerides and the FFAs in biological oils and fats can be converted into diesel or jet fuel using many different processes, such as hydrodeoxygenation and hydroisomerization processes.

Fuel processed from renewable biological sources is desirable for a variety of reasons. Foremost, the use of renewable biological-sourced fuels reduces the demand for the extraction and use of fossil fuels. This is especially true for transportation fuels such as diesel and jet fuel. In addition to the ecological benefits of using biological-sourced fuel, there exists a market demand for such fuel. For fuel purchasers, the use of biological-sourced fuel can be promoted in public relations. Also, certain governmental policies may require or reward use of biological-sourced fuels.

Current renewable transportation fuel production processes produce a variety of effluent streams that must be treated and disposed of.

It would be desirable to reduce the complexity of the process while providing proper treatment of the effluent streams, especially those related to acid gas and sour water. It would also be desirable to reduce the cost of the chemicals used in treating the effluent streams. It would also be desirable to reduce the amount of equipment in the complex.

DETAILED DESCRIPTION

Figure 1:
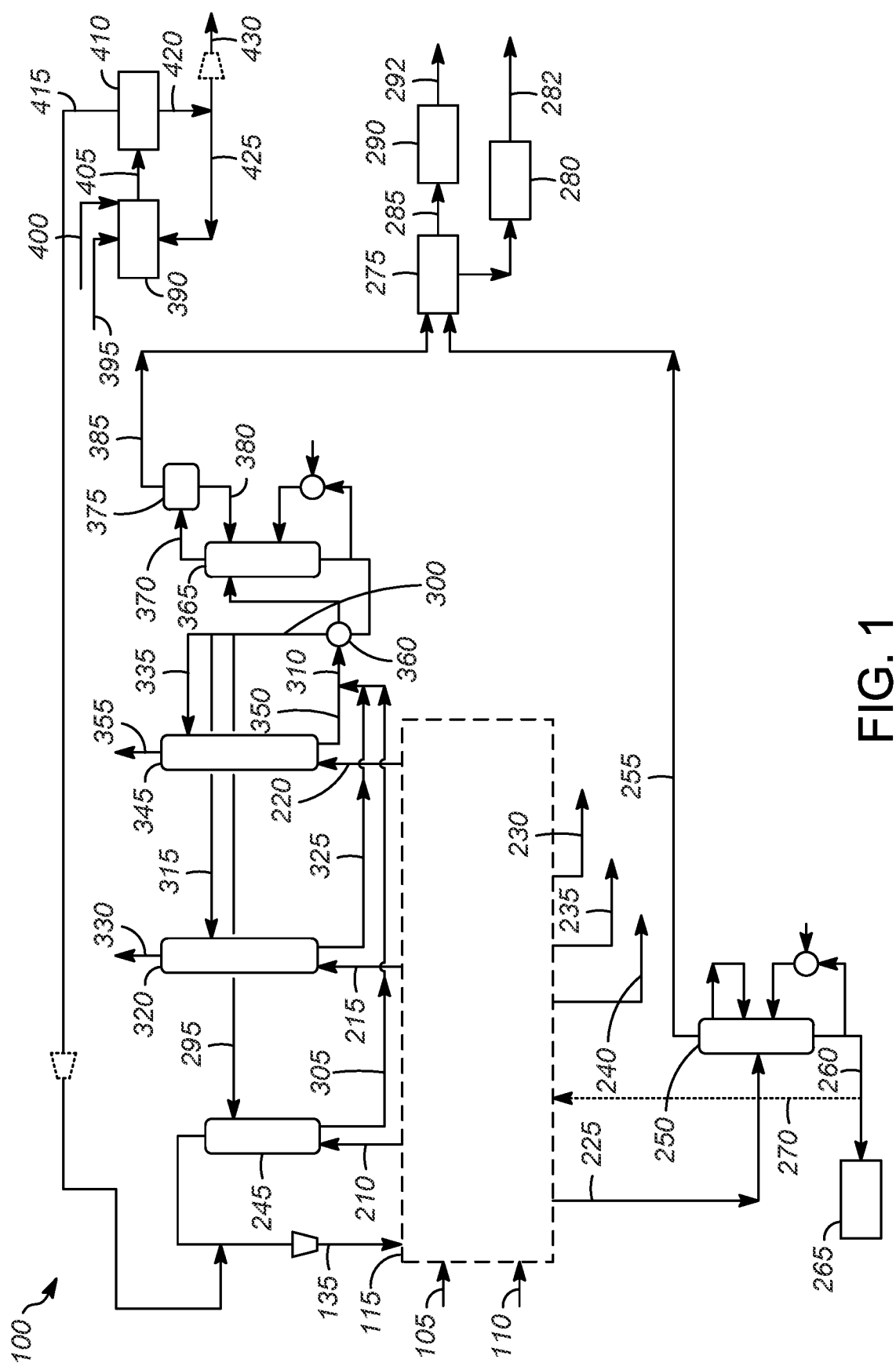
FIG. 1 is an illustration of a conventional waste treatment process for a renewable transportation fuel production process.

The renewable transportation fuel production process produces one or more sour water streams. The sour water streams include a cold separator sour water stream from a cold separator in the cold separation and fractionation section, a de-butanizer receiver sour water stream from a de-butanizer in the cold separation and fractionation section, and a stripper receiver sour water stream from a stripper receiver in the cold separation and fractionation section. The sour water streams are sent to a sour water stripper unit. A portion of the sweet water may be returned to the renewable transportation fuel production process or sent to other units in the refining complex, such as a hydroprocessing unit water wash section, a crude desalter and the like. The remainder is sent to a waste water treatment plant. Acid gas from the sour water stripper unit is sent to a sulfur recovery unit. The condensed elemental sulfur in the sulfur recovery unit (SRU) in some cases is sent of a belt filter and a cake composed of sulfur containing material is removed. The gaseous material from the SRU is sent to a thermal oxidizer and/or vented to the atmosphere.

The process also produces one or more acid gas streams in an acid gas treatment section. The acid gas treatment section includes an acid recycle gas amine contactor, an acid LPG de-butanizer receiver LPG effluent amine contactor, an acid lean gas sponge absorber gas overhead amine contactor, and a common amine regenerator. The amine regenerator overhead condenser and reflux drum off-gas is sent to the sulfur recovery unit, belter filter, and thermal oxidizer.

In the acid gas treatment section, a lean amine stream is contacted (e.g., counter currently) with the acid recycle gas stream from the cold separator in the cold separation and fractionation section in a recycle gas amine contactor. The lean amine stream is contacted with the acid LPG stream from the de-butanizer receiver vessel in the cold separation and fractionation section in a de-butanizer receiver amine contactor. The lean amine stream is contacted with the lean acid gas stream from the sponge absorber in the cold separation and fractionation section in a sponge absorber lean gas overhead amine contactor. The acid gas streams contain $CO_2$ and $H_2S$, which are transferred to the lean amine stream converting it to a rich amine stream. The absorbed $CO_2$ and $H_2S$ are removed from the rich amine stream by steam stripping in the common amine regenerator to form the lean amine stream and the regenerator overhead stream. The regenerator overhead stream is sent to an amine regenerator overhead condenser and reflux drum where it is separated into a liquid reflux stream and an amine acid gas stream. The liquid reflux stream is returned to the common amine regenerator. The acid gas which contains the $CO_2$ and $H_2S$ is sent to the sulfur recovery unit.

One aspect of the invention is a process for treating acid gas and sour water effluent streams in a process for producing renewable transportation fuel. In one embodiment, the process comprises: thermally oxidizing at least one of a sour water stream from a cold separation and fractionation section of the renewable transportation fuel process and an amine acid gas stream from an acid gas treatment section of the renewable transportation fuel process in a thermal oxidation system, wherein the sour water stream is not treated in a sour water stripper unit before being thermally oxidized in the thermal oxidation system and the amine acid gas stream is not treated in a sulfur recovery unit before being thermally oxidized in the thermal oxidation system, and wherein thermally oxidizing the at least one of the sour water stream and the amine acid gas stream comprises: thermally oxidizing the at least one of the sour water stream and the amine acid gas stream in a thermal oxidizing section forming a flue gas stream consisting essentially of at least one of $H_2O$, $CO_2$, $N_2$, $O_2$, SOx, NOx, HCl, $Cl_2$, dioxins, and furans; optionally recovering waste heat from the flue gas stream in a waste heat recovery section; removing at least one of SOx, HCl, and $Cl_2$ from the flue gas stream in a SOx removal section to form a de-SOx outlet flue gas stream consisting essentially of at least one of $H_2O$, $CO_2$, $N_2$, $O_2$, NOx, dioxins, and furans, wherein removing the at least one of SOx, HCl, and $Cl_2$ from the flue gas stream comprises: quenching the flue gas stream in a quench section to form a quenched flue gas stream; and contacting a caustic solution or an $NH_3$ based solution with the quenched flue gas stream in a scrubbing section to form the de-SOx outlet flue gas stream and a liquid stream comprising at least one of $H_2O$, $Na_2SO_3$, $Na_2SO_4$, $NaHSO_3$, $Na_2CO_3$, NaCl, $(NH_4)_2SO_4$, and $NH_4Cl$; or reacting the flue gas stream with a reactant in an SOx reaction section to form a reaction section flue gas stream consisting essentially of at least one of $H_2O$, $CO_2$, $N_2$, $O_2$, NaCl, $Na_2CO_3$, $Na_2SO_4$, $NaNO_3$, $CaCl_2$, $CaSO_4$, $CaCO_3$, $Ca(NO_3)_2$, $MgCl_2$, $MgCO_3$, $MgSO_4$, $Mg(NO_3)_2$, $Cl_2$, NOx, dioxins, and furans, wherein the reactant comprises at least one of $NaHCO_3$, $NaHCO_3.Na_2CO_3.2(H_2O)$, $CaCO_3$, $Ca(OH)_2$, and $Mg(OH)_2$; and filtering the reaction section flue gas stream in a filtration section to remove NaCl, $Na_2CO_3$, $Na_2SO_4$, $NaNO_3$, $CaCl_2$, $CaSO_4$, $CaCO_3$, $Ca(NO_3)_2$, $MgCl_2$, $MgCO_3$, $MgSO_4$, and $Mg(NO_3)_2$ to form the de-SOx outlet flue gas stream; optionally removing NOx from the de-SOx outlet flue gas stream in an NOx removal section to form a de-NOx outlet flue gas stream consisting essentially of at least one of $H_2O$, $CO_2$, $N_2$, $O_2$, dioxins, and furans; and optionally removing dioxin, furan, or both from the de-SOx outlet flue gas stream or the de-NOx outlet flue gas stream in a dioxin-furan removal section to form a treated outlet flue gas stream consisting essentially of at least one of $H_2O$, $CO_2$, $N_2$, and $O_2$. By thermally oxidizing a specified stream, we mean that the thermally oxidizable hydrocarbon components in the stream are thermally oxidized. For example, with the sour water stream, the thermally oxidizable hydrocarbon components and sulfur and nitrogen components in the sour water stream are thermally oxidized; the water is evaporated.

In some embodiments, the sour water stream comprises at least one of a cold separator sour water stream from a cold separator in the cold separation and fractionation section, a de-butanizer receiver sour water stream from a de-butanizer in the cold separation and fractionation section, and a stripper receiver sour water stream from a stripper receiver in the cold separation and fractionation section.

In some embodiments, the amine acid gas stream comprises a regenerator amine acid gas stream from a common amine regenerator overhead condenser and reflux drum.

In some embodiments, the process further comprises: at least one of: contacting a first portion of a lean amine stream with an acid recycle gas stream from a cold separator in the cold separation and fractionation section in a recycle gas amine contactor to form a first portion of a rich amine stream; contacting a first portion of a lean amine stream with an acid liquefied petroleum gas (LPG) stream from a de-butanizer receiver vessel in the cold separation and fractionation section in a de-butanizer receiver amine contactor to form a second portion of a rich amine stream; and contacting a third portion of a lean amine stream with a lean acid gas stream from a sponge absorber in the cold separation and fractionation section in a sponge absorber lean gas overhead amine contactor to form a third portion of a rich amine stream; regenerating at least one of the first, second, and third portions of the rich amine stream in the common amine regenerator to form the lean amine stream and an overhead regenerator amine acid gas stream; separating the overhead amine acid gas stream into the regenerator amine acid gas stream and a reflux liquid stream in an amine regenerator overhead condenser; and refluxing the reflux liquid stream to the common amine regenerator.

In some embodiments, the process further comprises: separating a purge stream from an acid recycle gas stream from a cold separator in the cold separation and fractionation section in a pressure swing adsorption unit into a recycle hydrogen stream and a PSA tail gas stream, combining the recycle hydrogen stream with the acid recycle gas stream, and introducing the PSA tail gas stream into the thermal oxidation system as fuel; contacting a second portion of a lean amine stream with an acid liquefied petroleum gas (LPG) stream from a de-butanizer receiver vessel in the cold separation and fractionation section in a de-butanizer receiver amine contactor to form a second portion of a rich amine stream; and contacting a third portion of a lean amine stream with a lean acid gas stream from a sponge absorber in the cold separation and fractionation section in a sponge absorber lean gas overhead amine contactor to form a third portion of a rich amine stream; regenerating at least one of the second and third portions of the rich amine stream in the common amine regenerator to form the lean amine stream and an overhead regenerator amine acid gas stream; separating the overhead amine acid gas stream into the regenerator amine acid gas stream and a reflux liquid stream in an amine regenerator overhead condenser; and refluxing the reflux liquid stream to the common amine regenerator.

In some embodiments, the process further comprises: preheating the sour water stream before thermally oxidizing the sour water stream using steam from the process for producing renewable transportation fuel or from recovered heat from the waste heat recovery section.

In some embodiments, the process further comprises: introducing a renewable feedstock to a guard bed to remove contaminants comprising one or more of alkali metals, oxygen compounds, sulfur compounds, and nitrogen compounds from the renewable feedstock; treating a renewable feedstock to remove additional oxygen compounds from the renewable feedstock; contacting the renewable feedstock with a hydroisomerization catalyst, a hydrocracking catalyst, or both in the presence of hydrogen under hydroisomerization and hydrocracking conditions in a hydroisomerization and hydrocracking section to form a reaction effluent;

separating and fractionating the reaction effluent in the cold separation and fractionation section to form at least one renewable transportation fuel.

In some embodiments, separating and fractionating the reaction effluent comprises: separating the reactor effluent in a cold separator into a liquid hydrocarbon stream, a cold separator recycle acid gas stream, and a cold separator sour water stream; stripping the liquid hydrocarbon stream into a stripper overhead stream and a stripper bottom stream; separating the stripper overhead stream in a stripper receiver into a stripper receiver liquid stream, a stripper receiver off-gas stream, and a stripper receiver sour water stream; contacting the stripper receiver off-gas stream with a sponge absorber forming a sponge absorber liquid stream and a lean acid gas stream; separating the stripper receiver liquid stream and optionally the sponge absorber liquid stream in a de-butanizer column into de-butanizer overhead stream, a de-butanizer bottom stream; separating the de-butanizer overhead stream in a de-butanizer receiver into an acid liquefied petroleum gas (LPG) stream, a de-butanizer receiver sour water stream, and a reflux stream; and fractionating the stripper bottom stream into at least one of a renewable jet fuel stream, a renewable diesel fuel stream, and a naphtha stream.

In some embodiments, the sour water stream comprises at least one of the cold separator sour water stream, stripper receiver sour water stream, and the de-butanizer receiver sour water stream.

In some embodiments, the process further comprises: at least one of: contacting a first portion of a lean amine stream with the cold separator acid recycle gas stream in a recycle gas amine contactor to form a first portion of a rich amine stream; contacting a second portion of the lean amine stream with the acid LPG stream from the de-butanizer receiver in a de-butanizer receiver amine contactor to form a second portion of the rich amine stream; and contacting a third portion of the lean amine stream with the lean acid gas stream from the sponge absorber in a sponge absorber overhead amine contactor to form a third portion of the rich amine stream; regenerating at least one of the first, second, and third portions of the rich amine stream in a common amine regenerator to form the lean amine stream and an overhead amine acid gas stream; separating the overhead amine acid gas stream into the amine acid gas stream and a reflux liquid stream in an amine regenerator overhead condenser; and refluxing the reflux liquid stream to the common amine regenerator.

In some embodiments, quenching the flue gas stream comprises quenching the flue gas stream with at least one of: air, the quenched flue gas stream, the de-SOx outlet flue gas stream, the de-NOx outlet flue gas stream, the treated outlet flue gas stream, and water.

In some embodiments, the process further comprises: introducing an uncompressed pressure swing adsorption (PSA) tail gas stream from a PSA unit connected to a hydrogen production plant to the thermal oxidation system as a fuel source.

In some embodiments, the process further comprises: introducing a slip stream of a lean acid gas stream from a sponge absorber to the thermal oxidation system as a fuel source.

Another aspect of the invention is a process for treating acid gas and sour water effluent streams in a process for producing renewable transportation fuel. In one embodiment, the process comprises: introducing a renewable feedstock to a guard bed to remove contaminants comprising one or more of alkali metals, oxygen compounds, sulfur compounds, and nitrogen compounds from the renewable feedstock; treating a renewable feedstock to remove additional oxygen compounds from the renewable feedstock; hydroisomerizing and hydrocracking the renewable feedstock to form a reaction effluent; separating the reactor effluent in a cold separator into a liquid hydrocarbon stream, a cold separator recycle acid gas stream, and a cold separator sour water stream; stripping the liquid hydrocarbon stream into a stripper overhead stream and a stripper bottom stream; separating the stripper overhead stream in a stripper receiver into a stripper receiver liquid stream, a stripper receiver off-gas stream, and a stripper receiver sour water stream; contacting the stripper receiver off-gas stream with a sponge absorber forming a sponge absorber liquid stream and a lean acid gas stream; separating the stripper receiver liquid stream and optionally the sponge absorber liquid stream in a de-butanizer column into de-butanizer overhead stream, a de-butanizer bottom stream; separating the de-butanizer overhead stream in a de-butanizer receiver into an acid liquefied petroleum gas (LPG) stream, a de-butanizer receiver sour water stream, and a reflux stream; fractionating the stripper bottom stream into at least one of a renewable jet fuel stream, a renewable diesel fuel stream, and a naphtha stream; at least one of: contacting a first portion of a lean amine stream with the cold separator acid recycle gas stream in a recycle gas amine contactor to form a first portion of a rich amine stream; contacting a second portion of the lean amine stream with the acid LPG stream from the de-butanizer receiver in a de-butanizer receiver amine contactor to form a second portion of the rich amine stream; and contacting a third portion of the lean amine stream with the lean acid gas stream from the sponge absorber in a sponge absorber overhead amine contactor to form a third portion of the rich amine stream; regenerating at least one of the first, second, and third portions of the rich amine stream in a common amine regenerator to form the lean amine stream and an overhead amine acid gas stream; separating the overhead amine acid gas stream into an amine acid gas stream and a reflux liquid stream in an amine regenerator overhead condenser; and refluxing the reflux liquid stream to the common amine regenerator; thermally oxidizing at least one of a sour water stream from the cold separation and fractionation section and the amine acid gas stream in a thermal oxidation system, wherein the sour water stream is not treated in a sour water stripper unit before being thermally oxidized in the thermal oxidation system and the amine acid gas stream is not treated in a sulfur recovery unit before being thermally oxidized in the thermal oxidation system, and wherein the sour water stream comprises at least one of the cold separator sour water stream from the cold separator in the cold separation and fractionation section, the de-butanizer receiver sour water stream from the de-butanizer in the cold separation and fractionation section, and the stripper receiver sour water stream from the stripper receiver in the cold separation and fractionation section; and wherein thermally oxidizing the at least one of the sour water stream and the amine acid gas stream comprises: thermally oxidizing the at least one of the sour water stream and the amine acid gas stream in a thermal oxidizing section forming a flue gas stream consisting essentially of at least one of $H_2O$, $CO_2$, $N_2$, $O_2$, SOx, NOx, HCl, $Cl_2$, dioxins, and furans; optionally recovering waste heat from the flue gas stream in a waste heat recovery section; removing at least one of SOx, HCl, and $Cl_2$ from the flue gas stream in a SOx removal section to form a de-SOx outlet flue gas stream consisting essentially of at least one of $H_2O$, $CO_2$, $N_2$, $O_2$, NOx, dioxins, and furans, wherein removing the at least one of SOx, HCl, and $Cl_2$ from the flue gas stream comprises: quenching the flue gas stream in a quench section to form a quenched flue gas stream; and contacting a caustic solution or an $NH_3$ based solution with the quenched flue gas stream in a scrubbing section to form the de-SOx outlet flue gas stream and a liquid stream comprising at least one of $H_2O$, $Na_2SO_3$, $Na_2SO_4$, $NaHSO_3$, $Na_2CO_3$, NaCl, $(NH_4)_2SO_4$, and $NH_4Cl$; or reacting the flue gas stream with a reactant in an SOx reaction section to form a reaction section flue gas stream consisting essentially of at least one of $H_2O$, $CO_2$, $N_2$, $O_2$, NaCl, $Na_2CO_3$, $Na_2SO_4$, $NaNO_3$, $CaCl_2$, $CaSO_4$, $CaCO_3$, $Ca(NO_3)_2$, $MgCl_2$, $MgCO_3$, $MgSO_4$, $Mg(NO_3)_2$, $Cl_2$, NOx, dioxins, and furans, wherein the reactant comprises at least one of $NaHCO_3$, $NaHCO_3.Na_2CO_3.2(H_2O)$, $CaCO_3$, $Ca(OH)_2$, and $Mg(OH)_2$; and filtering the reaction section flue gas stream in a filtration section to remove NaCl, $Na_2CO_3$, $Na_2SO_4$, $NaNO_3$, $CaCl_2$), $CaSO_4$, $CaCO_3$, $Ca(NO_3)_2$, $MgCl_2$, $MgCO_3$, $MgSO_4$, and $Mg(NO_3)_2$ to form the de-SOx outlet flue gas stream; optionally removing NOx from the de-SOx outlet flue gas stream in an NOx removal section to form a de-NOx outlet flue gas stream consisting essentially of at least one of $H_2O$, $CO_2$, $N_2$, $O_2$, dioxins, and furans; and optionally removing dioxin, furan, or both from the de-SOx outlet flue gas stream or the de-NOx outlet flue gas stream in a dioxin-furan removal section to form a treated outlet flue gas stream consisting essentially of at least one of $H_2O$, $CO_2$, $N_2$, and $O_2$.

In some embodiments, the process further comprises: preheating the sour water stream before thermally oxidizing the sour water stream using steam from the process for producing renewable transportation fuel or from recovered heat from the waste heat recovery section.

In some embodiments, quenching the flue gas stream comprises quenching the flue gas stream with at least one of: air, the quenched flue gas stream, the de-SOx outlet flue gas stream, the de-NOx outlet flue gas stream, the treated outlet flue gas stream, and water.

In some embodiments, the process further comprising: introducing an uncompressed pressure swing adsorption (PSA) tail gas stream from a PSA unit connected to a hydrogen production plant to the thermal oxidation system as a fuel source.

In some embodiments, the process further comprises: introducing a slip stream of a lean acid gas stream from a sponge absorber to the thermal oxidation system as a fuel source.

FIG. 1 illustrates an overview of one embodiment of a conventional process 100 for treating gas and sour water effluent stream in a process for producing renewable transportation fuel. As is understood by those of skill in the art, other arrangements are possible, and not all pieces of equipment would present in every process. A renewable feedstock 105 and optionally a petroleum feedstock 110 are introduced in a single stage or two stage renewable transportation fuel production unit 115 for making a renewable transportation fuel.

Figure 2:
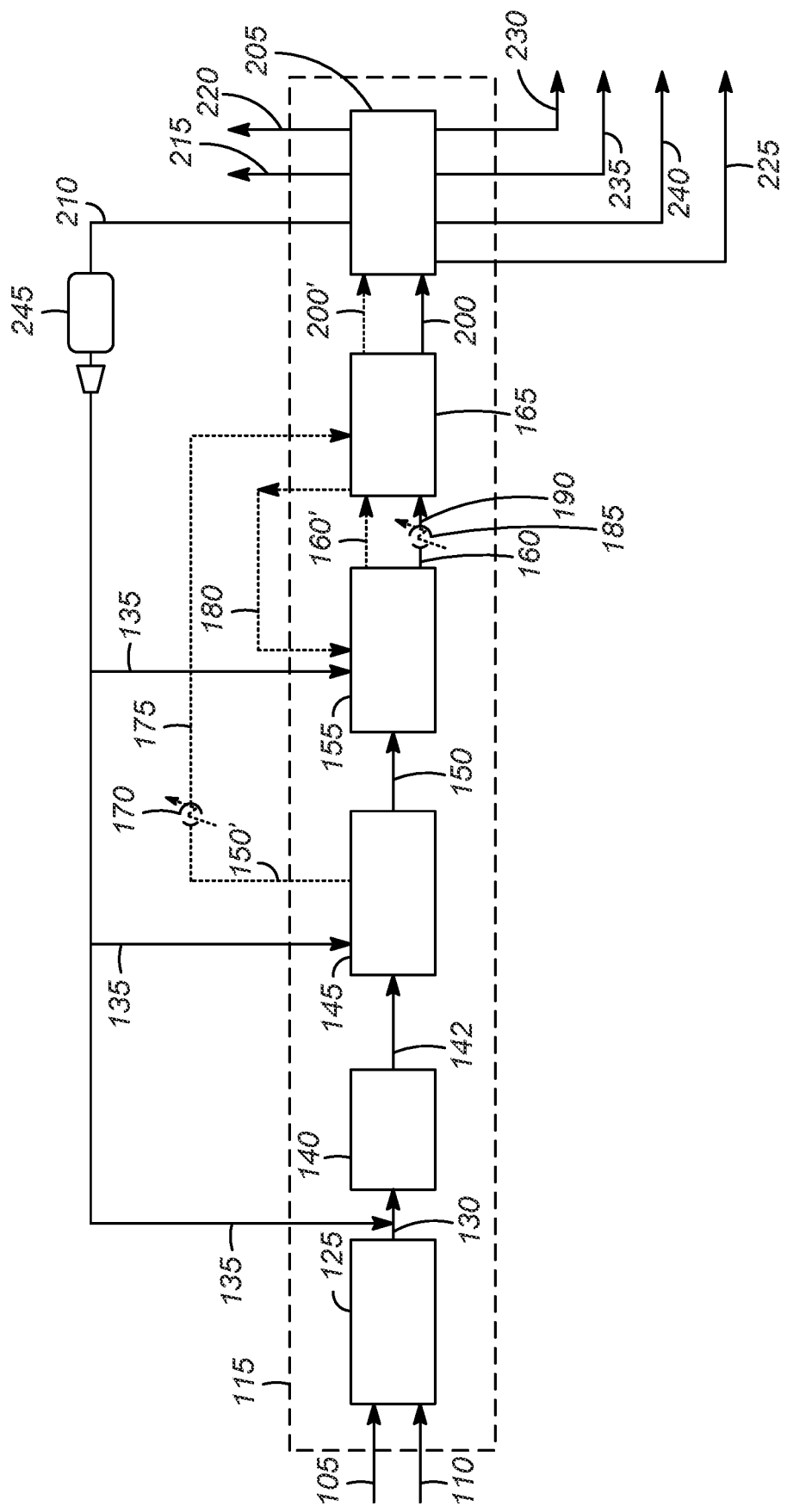
FIG. 2 is an illustration of a portion of a process for producing renewable transportation fuel.

FIG. 2 provides details of one embodiment of the conventional renewable transportation fuel production unit 115 of FIG. 1. As is understood by those of skill in the art, other arrangements are possible, and not all pieces of equipment would present in every process. The renewable transportation fuel production process can be single stage or two stage process, as is known in the art.

The renewable feedstock 105 includes, but is not limited to, glycerides, fatty acid alkyl esters (FAAE), and free fatty acids (FFA). Most of the glycerides will be triglycerides, but monoglycerides and diglycerides may be present and processed as well. Examples of renewable feedstocks include, but are not limited to, canola oil, corn oil, soy oils, rapeseed oil, soybean oil, colza oil, tall oil, sunflower oil, hempseed oil, olive oil, linseed oil, coconut oil, castor oil, peanut oil, palm oil, mustard oil, cottonseed oil, jatropha oil, ratanjoy oil, wild castor oil, jangli oil erandi oil, mohuwa oil, karanji honge oil, neem oil, inedible tallow, yellow and brown greases, lard, train oil, fats in milk, fish oil, algal oil, sewage sludge, cuphea oil, camelina oil, curcas oil, babassu oil, palm kernel oil, crambe oil, fatty acid methyl esters, lard, and the like, or any oil from a natural source or produced through microbial action. The glycerides, FAAEs and FFAs of the typical vegetable oil or animal fat contain aliphatic hydrocarbon chains in their structure which have about 8 to about 24 carbon atoms, with a majority of the fats and oils containing high concentrations of fatty acids with 16 and 18 carbon atoms.

In some cases, the renewable feedstock 105 may be rich in nitrogen, meaning having greater than 100 ppm nitrogen, or in some embodiments greater than 60 ppm nitrogen.

The renewable feedstocks may contain a variety of impurities. For example, tall oil contains esters and rosin acids in addition to FFAs. Rosin acids are cyclic carboxylic acids. The renewable feedstocks may also contain contaminants such as alkali metals, e.g. sodium and potassium, alkali earth metals, e.g., calcium and magnesium, phosphorous, proteins, nitrogen, and sulfur, as well as solids, water, and detergents. It is desirable to remove as much of these contaminants as possible.

The renewable feedstock 105 and optionally a virgin petroleum feedstock 110 may be sent to a surge drum 125. From the surge drum 125, the renewable feedstock 130 may be combined with a recycle hydrogen stream 135 and sent to one or more guard beds 140 and/or treatment units 145 in order to remove the contaminants. If there are both guard beds 140 and treatment units 145, the effluent 142 from the guard bed 140 is sent to the treatment unit 145.

The use of guard beds 140 for removing metal contaminants from the renewable feedstock 130 is well known in the art. These can include alumina guard beds either with or without demetallation catalysts such as nickel or cobalt. Filtration and solvent extraction techniques are other choices that may be employed.

Possible treatment units 145 include, but are not limited to, those for deoxygenation of triglyceride molecules, olefins saturation, nitrogen removal, sulfur removal, metals removal, and halide removal. Deoxygenation of triglyceride molecules involves decarboxylation and/or decarbonylation and/or hydrodeoxygenation to remove oxygen from the renewable feedstock. Olefins saturation involves the saturation of the olefinic or unsaturated portions in the hydrocarbon chains with hydrogen. Saturation of olefins is an exothermic reaction and consumes hydrogen. The quantity of olefins varies with the source of the feedstock. Nitrogen removal involves conversion of the organic nitrogen in the feedstock (such as from trace amino acids) to ammonia. Since nitrogen is a poison to the isomerization catalyst, the nitrogen content of the effluent from the treatment units 145 should be below 50 ppb. Sulfur removal involves converting native sulfur in the feedstock into $H_2S$. Because the active state of catalysts is the sulfided form, additional sulfur (typically dimethyl disulfide (DMDS)) is added to the feed which also converts to $H_2S$. The $H_2S$ in turn prevents oxidation and reduction of the active guard and treating catalyst metals exposed to the $H_2O$ and $H_2$ in the hydrotreating environment. With respect to metals removal, phosphorous and other metals are retained on the catalyst by a combination of adsorption and chemical reaction. The catalyst has a certain maximum tolerance for retaining metals. The useful life of the guard and treating catalysts will be determined, to a large extent, by the amount of metals that are accumulated on it during the course of the operation. The metals (Na, Ca, K, Mg, Al, and Fe) originate from the renewable feedstock where they are naturally occurring and related to phospholipid compounds present in the renewable feedstock feed. Silicon may be a contaminant from processing of the feed oils, while iron may also be picked up from processing and storage of acidic feeds.

The guard bed(s) 140 and treatment units 145 may be in separate vessels, or there can be more than one bed in a single vessel.

In a one-stage process, the treated stream 150 is sent to a hydroisomerization and hydrocracking reaction section 155. A recycle hydrogen stream 135 is also introduced into the hydroisomerization and hydrocracking reaction section 155. The effluent stream 160 from the hydroisomerization and hydrocracking reaction section 155 is cooled by removing the thermal energy in a steam generator 185. The cooled stream 190 is sent to the separation section 165. The separation section 165 includes an isomerization/cracking effluent separator. The effluent stream 200 from the separation section 165 is sent to the cold separation and fractionation section 205.

In a two-stage process, the treated stream 150' is cooled by removing thermal energy in a steam generator 170. The cooled stream 175 is sent to the hot separator, followed by the enhanced hot separator of the separation section 165. The separation section 165 also includes an isomerization/cracking effluent separator. The liquid stream 180 from the enhanced hot separator of the separation section 165 is sent to the hydroisomerization and hydrocracking reaction section 155. The effluent stream 160' is sent to the isomerization/cracking effluent separator in the separation section 165. The liquid from the isomerization/cracking effluent separator is sent to the hot separator and the gaseous effluent is sent to the enhanced hot separator. Vapor streams from the hot separator and enhanced hot separator form effluent stream 200' from the separation section 165 which is sent to the cold separation and fractionation section 205.

The hydroisomerization and hydrocracking reaction section 155 may comprise one or more reactors each of which may contain one or more beds containing at least one hydroisomerization catalyst, at least one a hydrocracking catalyst, or both. Some embodiments may require external heat input. It is contemplated that all the reactions occur simultaneously in one reactor or in one bed. However, typical operation will most likely utilize multiple beds, and possibly multiple reactors, with different reactions occurring in different beds and/or reactors.

The hydroisomerization and selective hydrocracking of the paraffinic product can be accomplished in any manner known in the art or by using any suitable catalyst known in the art. One or more beds of catalyst may be used. It is preferred that the isomerization be operated in a co-current mode of operation. Fixed bed, trickle bed down flow or fixed bed liquid filled up-flow modes are both suitable.

The predominant isomerization product is generally a mono-branched hydrocarbon. Along with the isomerization, hydrocracking of the hydrocarbons will occur. The more severe the conditions of the hydroisomerization and hydrocracking reaction section 155, the greater the amount of hydrocracking of the hydrocarbons. Increased levels of hydrocracking produces higher yields of hydrocarbons in the aviation fuel boiling range.

The hydroisomerization and hydrocracking of the paraffinic hydrocarbons in the hydroisomerization and hydrocracking reaction section 155 can be accomplished in any manner known in the art or by using any suitable catalyst known in the art. Suitable catalysts comprise a metal of Group VIII (IUPAC 8-10) of the Periodic Table and a support material. Suitable Group VIII metals include platinum and palladium, each of which may be used alone or in combination. The support material may be amorphous or crystalline. Suitable support materials include aluminas, amorphous aluminas, amorphous silica-aluminas, and the like. The isomerization catalyst may also comprise a modifier selected from the group consisting of lanthanum, cerium, praseodymium, neodymium, samarium, gadolinium, terbium, and mixtures thereof.

In general, isomerization conditions for the hydroisomerization and hydrocracking reaction section 155 include a temperature of about 150° C. to about 450° C. (302° F. to 842° F.), or between about 300° C. and about 400° C. (572° F. to 752° F.), or between about 300° C. and about 360° C. (572° F. to 680° F. Typical isomerization pressures may be between about 2760 to about 6890 kPa (400 to 1000 psig), or in some embodiments between about 2760 to about 4820 kPa (400 to 700 psig). Other operating conditions for the isomerization zone are well known in the art, and the specific operating conditions used are predetermined and are dependent upon the desired product specifications and relative yields of the products.

The process severity in the hydroisomerization and hydrocracking section 155 controls the potential yield of product for aviation fuel, the amount of light products that are not useful for diesel fuel or aviation fuel, and the isomerized/normal ratio of both aviation and diesel range fuel. Hydrocracking is controlled through catalyst choice and reaction conditions in an attempt to restrict the degree of hydrocracking. Ideally, each paraffin molecule would experience only a single hydrocracking event and ideally that single hydrocracking event would result in at least one paraffin in the $C_9$ to $C_{15}$ carbon number range. Careful choice of catalyst and control of the process conditions in the hydroisomerization and hydrocracking reaction section 155 may maximize paraffin products in the aviation fuel range while minimizing the production of the light paraffins, i.e., paraffins with carbon chains of 3 or fewer, which are not useful for either diesel fuel or aviation fuel applications.

It is noted that fuel specifications are typically not based upon carbon number ranges. Instead, the specifications for different types of fuels are often expressed through acceptable ranges of chemical and physical requirements of the fuel. For example, often a distillation range from 10 percent recovered to a final boiling point is used as a key parameter defining different types of fuels. The distillations ranges are typically measured by ASTM Test Method D86 or D2887. Blending of different components in order to meet the different specifications and requirements is quite common.

Effluent stream 200/200' is sent to cold separation and fractionation section 205. In the cold separation and fractionation section 205, the effluent stream 200/200' is separated into an acid recycle gas stream 210, an acid liquefied petroleum gas (LPG) stream 215 a lean acid gas stream 220, a sour water stream 225, naphtha stream 230, renewable jet fuel stream 235, and renewable diesel stream 240. The cold separation and fractionation section 205 will be described in more detail below.

The acid recycle gas stream 210, which comprising hydrogen, carbon monoxide, hydrogen sulfide, carbon dioxide and propane is sent to a recycle gas amine contactor 245 to remove the carbon monoxide, hydrogen sulfide, and some carbon dioxide and propane. The recycle hydrogen stream 135 can be combined with the renewable feedstock 130, sent to the treatment unit 145, or sent to the hydroisomerization and hydrocracking reaction section 155.

Figure 3:
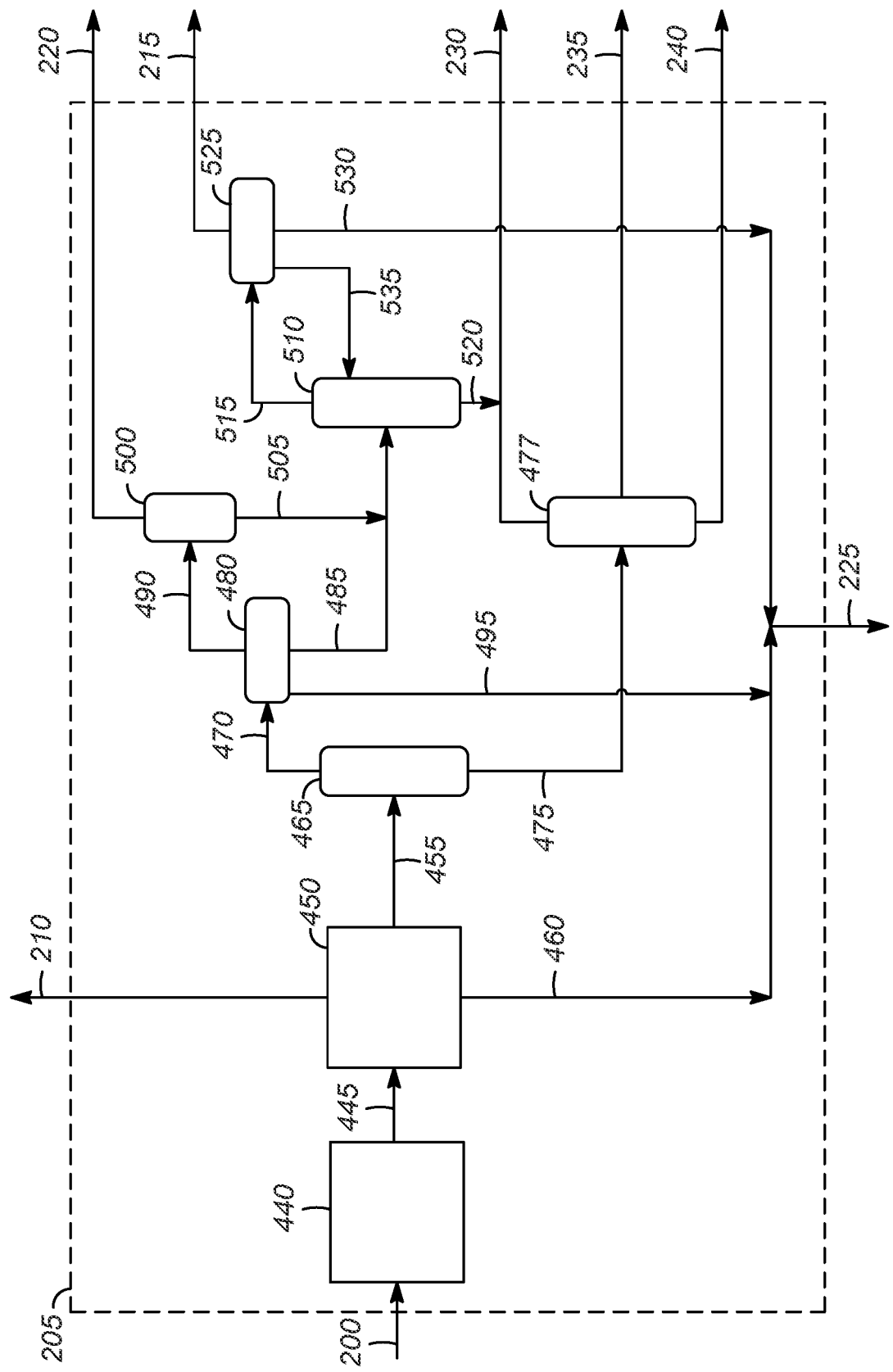
FIG. 3 is an illustration of one embodiment of a cold separation and fractionation section.

FIG. 3 illustrates one embodiment of a cold separation and fractionation section 205. As is understood by those of skill in the art, other arrangements are possible, and not all pieces of equipment would present in every process. In the cold separation and fractionation section 205, effluent stream 200/200' comprising a combination of one or more of vapor from a hot separator, vapor from an enhanced hot separator, and liquid from an isomerization/cracking effluent separator, is sent to a condenser 440 in the cold separation and fractionation section 205. The condensed stream 445 is sent to a cold separator 450 where it is separated into a liquid hydrocarbon stream 455, cold separator sour water stream 460, and the acid recycle gas stream 210. The details of the hot separation section 165 and the cold separation and fractionation section 205 are well known to those of skill in the art.

The liquid hydrocarbon stream 455 from the cold separator 450 is sent to a steam stripper 465. The acid recycle gas stream 210 is sent to the recycle gas amine contactor 245 for removal of $CO_2$ and $H_2S$.

The liquid hydrocarbon stream 455 is separated into a stripper overhead stream 470 and a stripper bottom stream 475 in the steam stripper 465. The stripper overhead stream 470 is sent to a stripper receiver 480 where it is separated into a stripper receiver liquid stream 485, a stripper receiver off-gas stream 490, and a stripper receiver sour water stream 495.

The stripper receiver off-gas stream 490 is contacted with a sponge absorber 500 forming a sponge absorber liquid stream 505 and the lean acid gas stream 220.

The stripper receiver liquid stream 485 and optionally the sponge absorber liquid stream 505 are sent to a de-butanizer column 510 where they are separated into de-butanizer overhead stream 515, and a de-butanizer bottom stream 520. The de-butanizer bottom stream 520, which contains naphtha, may be combined with naphtha stream 230.

The de-butanizer overhead stream 515 is separated in a de-butanizer receiver 525 into the acid LPG stream 215, a de-butanizer receiver sour water stream 530, and a reflux stream 535. The acid LPG stream 215 is sent to the de-butanizer receiver amine contactor 320. The reflux stream 535 is returned to the de-butanizer column 510.

The stripper bottom stream 475 sent to fractionator 477 where it is fractionated into the naphtha stream 230, and at least one of the renewable jet fuel stream 235, and the renewable diesel stream 240.

One or more of the cold separator sour water stream 460 from the cold separator 450, the de-butanizer receiver sour water stream 530 from the de-butanizer receiver 525, and the a stripper receiver sour water stream 495 from the stripper receiver 480 can be combed into sour water stream 225 sent to the sour water stripper (SWS) unit 250.

Returning to FIG. 1, the sour water stream 225 is sent to SWS unit 250 where it is separated into an SWS acid gas stream 255 and a SWS bottom stream 260 using steam. The SWS bottom stream can be sent to a waste water treatment plant 265. A portion 270 of the SWS bottom stream 260 can be returned to the renewable transportation fuel production unit 115, or sent to other units in the refining complex.

The SWS acid gas stream 255 is sent to a sulfur recovery unit (SRU) 275. Suitable SRUs are known in the art, including but not limited to the Claus process, and liquid redox sulfur units, or biological processes. The removed sulfur is sent to a filtration section 280 where the sulfur is removed as a sulfur filter cake 282. The gas stream 285 from the SRU 275 is sent to a thermal oxidizing section 290, and the flue gas 292 is vented to the atmosphere.

The acid recycle gas stream 210 is contacted with a first portion 295 of a lean amine stream 300 in the recycle gas amine contactor 245 and forms a first portion 305 of a rich amine stream 310 containing the hydrogen sulfide removed from the acid recycle gas stream 210. The recycle hydrogen stream 135 is returned to the renewable transportation fuel production unit 115 as discussed above with respect to FIG. 2.

The acid LPG stream 215 is contacted with a second portion 315 of the lean amine stream 300 in a de-butanizer receiver amine contactor 320 and forms a second portion 325 of the rich amine stream 310 containing the hydrogen sulfide from the acid LPG stream 215. The sweet LPG 330 can be sent to storage, or it can be used as feedstock for a hydrogen reformer.

The lean acid gas stream 220 is contacted with a third portion 335 of the lean amine stream 300 in a sponge absorber gas overhead amine contactor 345 forming a third portion 350 of the rich amine stream 310 containing the hydrogen sulfide from the lean acid gas stream 220. The sweet lean gas 355 can be sent to the fuel gas network.

The rich amine stream 310 is sent to a heat exchanger 360 where it exchanges heat with the lean amine stream 300. The rich amine stream 310 is sent to the common amine regenerator 365 where it is steam stripped forming the lean amine stream 300 and an overhead amine acid gas stream 370. The overhead amine acid gas stream 370 is sent to the amine regenerator overhead condenser 375 where it is separated into a liquid reflux stream 380 and an amine acid gas stream 385. The liquid reflux stream 380 is returned to the common amine regenerator 365. The amine acid gas stream 385 is sent to the SRU 275.

In some embodiments, there can be an associated steam reforming zone 390. A sweet naphtha stream 395 and/or a sweet LPG stream 400 are sent to the steam reforming zone 390. Other fuels are also possible, including, but not limited to, natural gas, methane, methanol, and the like. The reforming zone effluent 405 (e.g., containing primarily hydrogen, along with $CO_2$, and smaller amounts of $CH_4$, CO, and $N_2$ and being saturated with water) is sent to the pressure swing adsorption (PSA) unit 410 where it is separated into a hydrogen stream 415 and a PSA tail gas stream 420. The hydrogen stream 415 can be compressed and sent to the renewable transportation fuel production unit 115. The PSA tail gas stream can be divided into a PSA tail gas recycle stream 425 which is sent to the steam reforming zone 390 and an excess PSA tail gas stream 430 which can be sent to the fuel gas network.

Figure 4A:
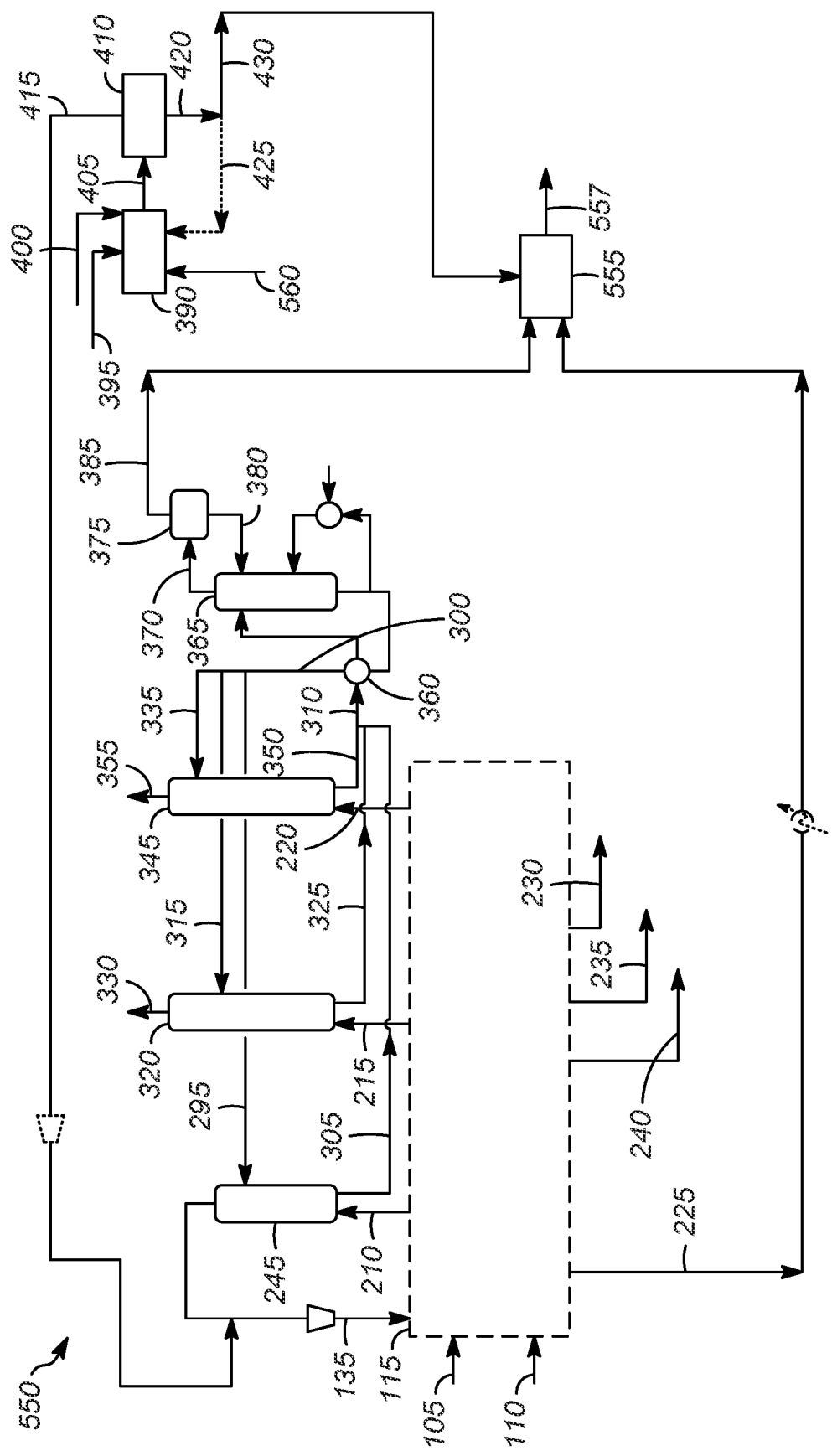
FIG. 4A is an illustration of one embodiment of a waste treatment process for a renewable transportation fuel production process according to the present invention.

In the process 550 shown in FIG. 4A, the sour water stripper unit, waste water treatment plant, and sulfur recovery unit have been eliminated. The sour water stream 225 is sent directly to the thermal oxidation system 555 without being treated in a sour water stripper unit, and there is no SWS acid gas stream. Alternatively, in some arrangements, only the sulfur recovery unit is eliminated. In this case, the SWS acid gas stream 255 would be sent directly to the thermal oxidation system (not shown). The amine acid gas stream 385 is sent directly to a thermal oxidation system 555, without having to be processed in a sulfur recovery unit. The flue gas 557 is vented to the atmosphere.

In some embodiments, the sour water stream 225 is preheated using steam from the renewable transportation fuel production unit 115 or recovered waste heat from the thermal oxidation system 555, as described below.

In some embodiments, a fuel gas stream 560 is sent to the steam reforming zone 390 for fuel. The uncompressed excess PSA tail gas stream 430 is sent to the thermal oxidation system 555 as fuel.

In some cases, an uncompressed excess PSA tail gas stream 430 from the PSA unit 410 associated with a hydrogen production plant may be sent to the thermal oxidation system 555 to be used as fuel source. The excess PSA tail gas stream 430 is typically recycled to the fired heater in the hydrogen plant at a pressure of 5 Psi(g). By sending the excess PSA tail gas stream 430 at a lower pressure, ranging between 2-4.9 psi(g), to the thermal oxidation system 555, the hydrogen recovery yield on the PSA unit 410 can be increased.

The fuel requirements needed for the fired heater for the reformer would be provided by a fuel gas stream 560 from the LP fuel gas network.

Figure 4B:
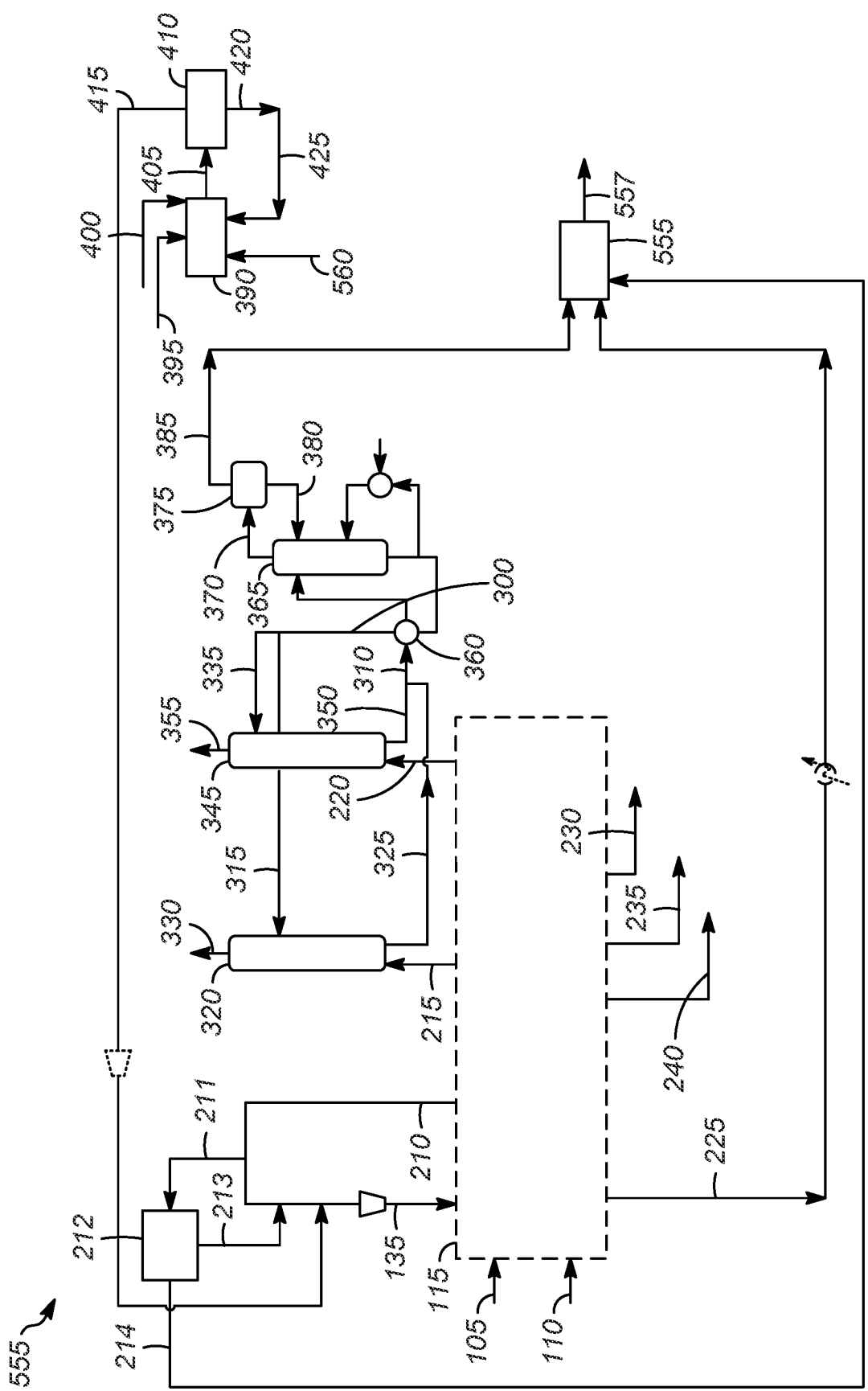
FIG. 4B is an alternate embodiment of the waste treatment process of FIG. 4A.

FIG. 4B shows an alternate embodiment. In this process, the recycle gas amine contactor 245 and, consequently, the first portion 295 of a lean amine stream 300 and the first portion 305 of the rich amine stream 310 are not present. The acid recycle gas stream 210 is compressed and recycle hydrogen stream 135 is returned to the process. A purge stream 211 is sent a PSA unit 212 where it is separated into hydrogen stream 213 and PSA tail gas stream 214. The hydrogen stream is combined with the remainder of acid recycle gas stream 210. The PSA tail gas stream is sent to the thermal oxidation system 555.

Figure 5:
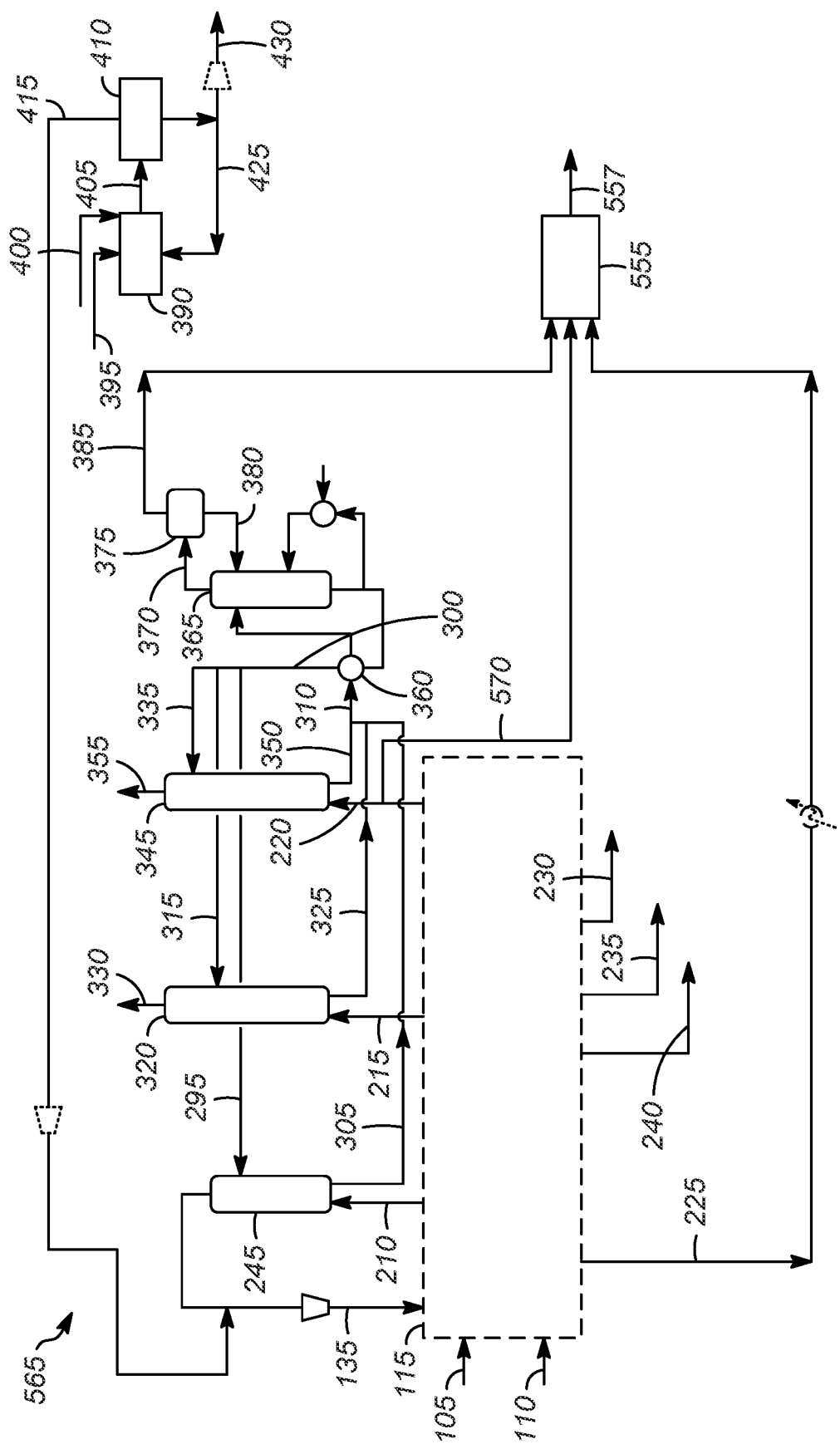
FIG. 5 is an illustration of another embodiment of a waste treatment process for a renewable transportation fuel production process according to the present invention.

In the process 565 of FIG. 5, a slip stream 570 of the lean acid gas stream 220 from the sponge absorber 500 is sent to the thermal oxidation system 555 as a fuel source for the thermal oxidation system 555. In this arrangement, the size of the sponge absorber gas overhead amine contactor 345 will be reduced. As a result, the size of the common amine regenerator 365 may also be reduced. In an alternate embodiment, the recycle gas amine contactor 245 could be removed, and the PSA unit 212 and the attendant changes described in FIG. 4B could be present.

Figure 6:
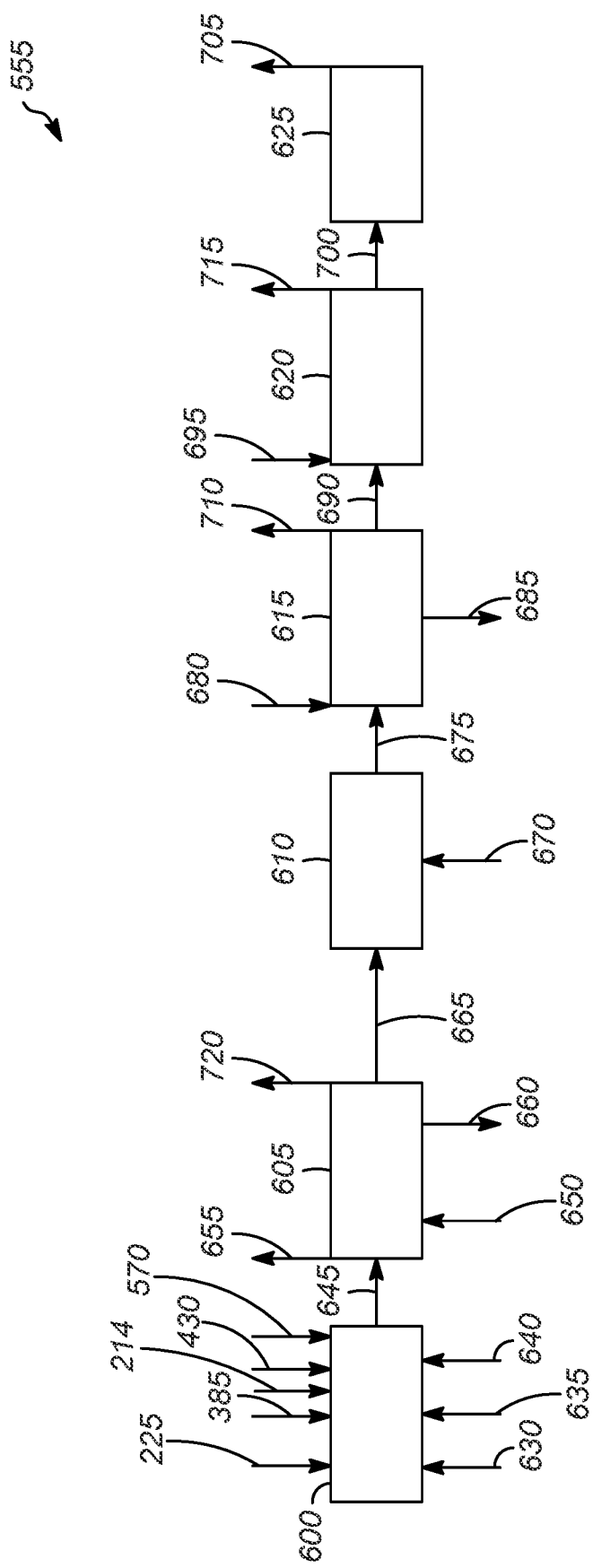
FIG. 6 is an illustration of one embodiment of a thermal oxidation system according to the present invention.

One embodiment of a thermal oxidation system 555 is illustrated in FIG. 6. The thermal oxidation system 555 comprises a thermal oxidizing section 600, an optional waste heat recovery section 605, a quench section 610, an SOx removal section 615, an optional NOx removal 462, and an optional dioxin-furan removal section 625.

At least one of the sour water stream 225, and the amine acid gas stream 385 are sent to the thermal oxidizing section 600, along with a combustion air stream 630, natural gas/fuel gas stream 635, and optionally quench air stream 640. Optionally, an excess PSA tail gas stream 430 and/or a lean acid gas slip stream 570 can also be sent to the thermal oxidizing section 600. The inlet temperature of the thermal oxidizing section 600 is typically in the range of −30-500° C. with a pressure of −1 kPa(g) to 3000 kPa(g). The outlet temperature is typically in the range of 650-1300° C. with a pressure of −1 kPa(g) to 50 kPa(g). The residence time in the thermal oxidizing section 600 is between 0.5 and 2 seconds. Any suitable thermal oxidizing section 600 could be used, including, but not limited to, an adiabatic thermal oxidizer chamber. The thermal oxidizing section 600 can be forced draft, induced draft, or a combination of both. An optional selective non-catalytic reduction (SNCR) section may be present in some cases. The inlet temperature of the SNCR section is typically in the range of 650-1300° C. with a pressure of −1 kPa(g) to 50 kPa(g). The outlet temperature is typically in the range of 650-1040° C. with a pressure of −1 kPa(g) to 50 kPa(g). The residence time in the SNCR section is between 0.2 and 1 seconds. The thermal oxidation step would be separated from the SNCR step via a choke wall in the vessel. The hydrocarbons are converted to $H_2O$ and $CO_2$. The sulfides from the sulfur species (e.g., $H_2S$) present in feed are converted to oxidized sulfur particulate SOx including, but not limited to, $SO_2$ and $SO_3$, and $H_2O$. The nitrogen from the nitrogen bound molecules (e.g. $NH_3$) present in the feed are converted to Nitrogen ($N_2$) and NOx, including but not limited to NO, $NO_2$. The HCl and $Cl_2$ (if any) remain.

The flue gas stream 645 from the thermal oxidizing section 600 consists essentially of one or more of $H_2O$, $CO_2$, $N_2$, $O_2$, SOx (i.e., $SO_2$ and $SO_3$), NOx (i.e., NO and $NO_2$), HCl, $Cl_2$, dioxins, and furans. "Consisting essentially of" means that one of more of the gases or vapors are present and there are no other gases or vapors present which require treatment before being released to the atmosphere, The flue gas stream 645 is sent to the optional waste heat recovery section 605. The inlet temperature of the optional waste heat recovery section 605 is typically in the range of 650-1300° C. with a pressure of −2 kPa(g) to 50 kPa(g). The outlet temperature is typically in the range of 200-400° C. with a pressure of −2 kPa(g) to 50 kPa(g). Suitable waste heat recovery apparatus and methods include, but are not limited to, a waste heat recovery boiler, including, but not limited to, a firetube boiler or a watertube boiler. Boiler feed water or oil stream 650 enters the waste heat recovery section 605 where a portion is converted to steam or hot oil stream 655, with the remainder exiting as blowdown water or oil stream 660. In some cases, the steam can be converted to electricity, for example using a steam turbine, if desired.

The recovered waste heat in steam or hot oil stream 655 can be in the form of low (e.g., less than 350 kPa(g)), medium (e.g., 350 kPa(g) to 1750 kPa(g)), or high (e.g., greater than 1750 kPa(g)) pressure saturated or superheated steam, hot oil, and/or electricity. The recovered heat can be used to provide heat to one or more pieces of equipment or process streams in the process for producing renewable transportation fuels or to other parts of the plant. For example, the recovered waste heat in steam or hot oil stream 655 can be used to supply heat to reboilers in the amine treatment unit, the fractionation column(s), and steam for the stripper column, or other areas of the plant, or for other heat requirements.

The flue gas stream 665 from the optional waste heat recovery section 605 flows to the quench section 610 where the temperature of the flue gas is reduced to the saturation temperature using quench stream 670. The inlet temperature of the quench section 610 is typically in the range of 200-400° C. with a pressure of −3 kPa(g) to 50 kPa(g). The inlet temperature could be up to 1300° C. if no waste heat reboiler is present. The outlet temperature is typically in the range of 45-150° C. with a pressure of −3 kPa(g) to 50 kPa(g). Quench stream 670 includes, but is not limited to, water, air, recycle flue gas, or combinations thereof.

The quenched flue gas stream 675 from the quench section 610 is sent to the SOx removal section 615 for removal of at least one of the SOx, HCl and $Cl_2$. The inlet temperature of the SOx removal section 615 is typically in the range of 45-150° C. with a pressure of −4 kPa(g) to 50 kPa(g). The outlet temperature is typically in the range of 45-150° C. with a pressure of −4 kPa(g) to 50 kPa(g). For example, the SOx removal section 615 may be a scrubbing section in which a stream 680 comprising aqueous NaOH is introduced into the scrubbing section where it reacts with the at least one of SOx, HCl, and $Cl_2$ in the flue gas. An aqueous stream 685 containing aqueous $Na_2SO_3$, $Na_2SO_4$, and NaCl exits the scrubbing section. If desired, a reducing agent such as $NaHSO_3$ or $H_2O_2$, can be included to react with the $Cl_2$ to form HCl which reacts to form NaCl. Alternatively, stream 680 could be an $NH_3$ based solution. The $NH_3$ reacts with the SOx to form $(NH_4)_2SO_4$. The $NH_3$ reacts with the $Cl_2$ to form $N_2$ and HCl, followed by the reaction of the HCl with the $NH_3$ forming $NH_4Cl$. A separate reducing agent is not needed when $NH_3$ is used. In this case, the aqueous stream 685 would include $H_2O$, NaCl, $(NH_4)_2SO_4$ and $NH_4Cl$.

The de-SOx outlet flue gas stream 690 from the SOx removal section 615 has a reduced level of at least one of SOx, NOx, and $Cl_2$ compared to the incoming quenched flue gas stream 675. The de-SOx outlet flue gas stream 690 comprises one or more of $H_2O$, $CO_2$, $N_2$, $O_2$, NOx, dioxins, and furans.

If NOx is present in the de-SOx outlet flue gas stream 690, the de-SOx outlet flue gas stream 690 is sent to the optional NOx removal section 620 to remove NOx. The inlet temperature of the NOx removal section 620 is typically in the range of 150-300° C. with a pressure of −5 kPa(g) to 50 kPa(g). The outlet temperature is typically in the range of 200-350° C. with a pressure of −5 kPa(g) to 50 kPa(g). The de-SOx outlet flue gas stream 690 may need to be heated to obtain the desired inlet temperature for the NOx removal section 620. For example, the NOx removal section 620 can be a selective catalytic reduction (SCR) section in which an ammonia and/or urea stream 695 are introduced into the SCR section where it reacts with the NOx and forms $N_2$ and $H_2O$. Any suitable SCR catalyst could be used, including but not limited to, ceramic carrier materials such as titanium oxide with active catalytic components such as oxides of base metals including $TiO_2$, $WO_3$ and $V_2O_5$, or an activated carbon based catalyst. The de-NOx outlet flue gas stream 700 comprises one or more of $H_2O$, $CO_2$, $N_2$, $O_2$, dioxins, and furans.

If there are any halogens present in the feed, this may result in the formation of dioxin and/or furans. These compounds must be removed before the gases can be vented to the atmosphere. If dioxins and/or furans are present in the de-SOx outlet flue gas stream 690 or the de-NOx outlet flue gas stream 700, the de-SOx outlet flue gas stream 690 or the de-NOx outlet flue gas stream 700 is sent to the optional dioxin-furan removal section 625 for removal of the dioxin and/or furan. The dioxin and furans can be removed using a catalyst. The inlet temperature of the dioxin-furan removal section 625 is typically in the range of 150-250° C. with a pressure of −6 kPa(g) to 50 kPa(g). The outlet temperature is typically in the range of 150-250° C. with a pressure of −6 kPa(g) to 50 kPa(g). The treated outlet flue gas stream 705, consisting essentially of one or more of $H_2O$, $CO_2$, $N_2$, and $O_2$, can be vented to the atmosphere.

If the levels of NOx and dioxins and/or furans in the de-SOx outlet flue gas stream 690 exceed environmental regulations, the system will probably contain both the NOx removal section 620 and dioxin-furan removal section 625. In this case, de-SOx outlet flue gas stream 690 will have a slightly higher temperature than de-NOx outlet flue gas stream 700. There may be a need for quenching the de-NOx outlet flue gas stream 700 before it enters the dioxin-furan removal section 625.

If the de-SOx outlet flue gas stream 690 does not contain NOx, dioxin, or furans, the optional NOx removal section 620 and optional dioxin-furan removal section 625 are not present. The de-SOX outlet flue gas stream 710, consisting essentially of one or more of $H_2O$, $CO_2$, $N_2$, and $O_2$, can be vented to the atmosphere.

If the de-SOx outlet flue gas stream 690 contains NOx, but no dioxin or furans, the optional dioxin-furan removal section 625 is not present. The de-NOx outlet flue gas stream 715, consisting essentially of one or more of $H_2O$, $CO_2$, $N_2$, and $O_2$, can be vented to the atmosphere.

If the de-SOx outlet flue gas stream 690 contains dioxin or furans, but not NOx, the optional NOx removal section 620 is not present. The de-SOx outlet flue gas stream 690 is sent to the optional dioxin-furan removal section 625. The treated outlet flue gas stream 705, consisting essentially of one or more of $H_2O$, $CO_2$, $N_2$, and $O_2$, can be vented to the atmosphere.

If the flue gas stream 645 does not contain SOx, NOx, the SOx removal section 615, the optional NOx removal section 620, and the optional dioxin-furan removal section 625 are not present. The flue gas stream 720 from the waste heat recovery section 605, consisting essentially of one or more of $H_2O$, $CO_2$, $N_2$, and $O_2$, can be vented to the atmosphere.

Figure 7:
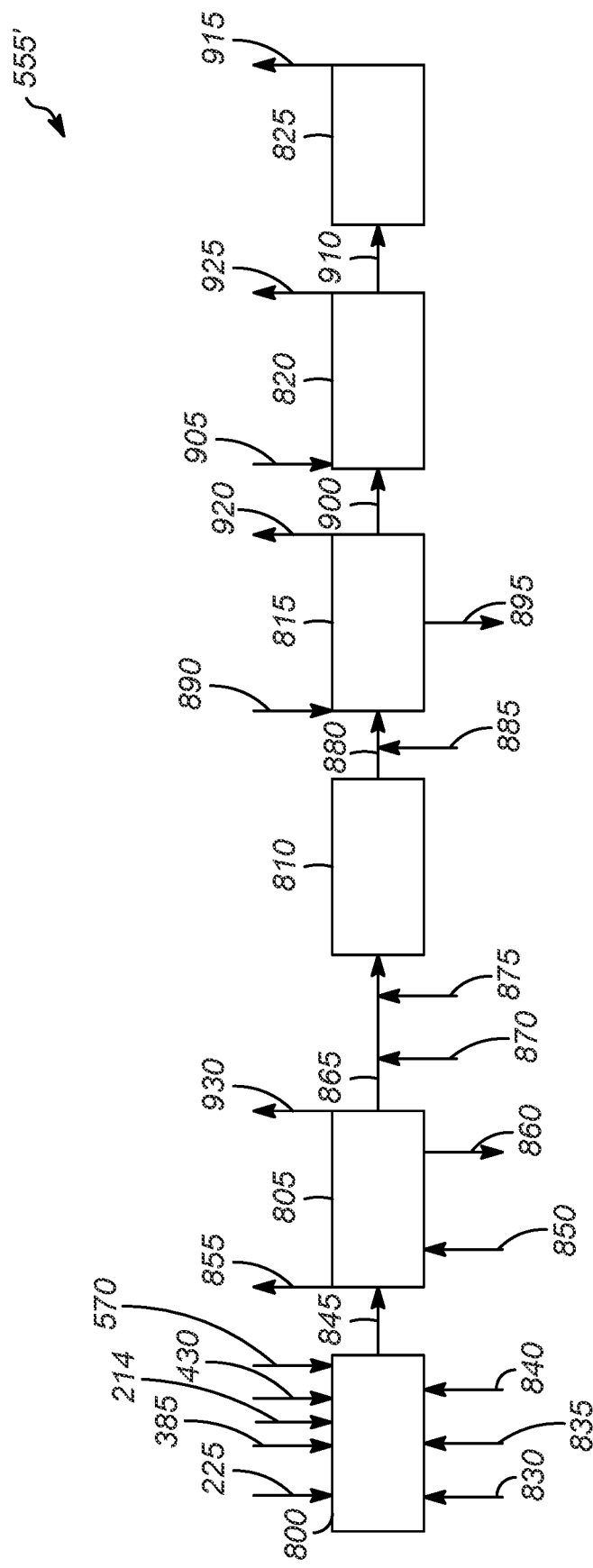
FIG. 7 is an illustration of another embodiment of a thermal oxidation system according to the present invention.

Another embodiment of the thermal oxidation system 555' is illustrated in FIG. 7. The thermal oxidation system 555' comprises a thermal oxidizing section 800, an optional waste heat recovery section 805, a SOx removal section which comprises reaction section 810 and filtration section 815, an optional NOx removal section 820, and an optional dioxin-furan removal section 825.

At least one of the sour water stream 225 and the amine acid gas stream 385 is introduced into the thermal oxidizing section 800, as described above. One or more of a combustion air stream 830, make-up natural gas or fuel gas stream 835, and optionally quench stream 840 are also introduced into the thermal oxidizing section 800. Optionally, an excess PSA tail gas stream 430 from a PSA unit 410 associated with a hydrogen production plant and/or a lean acid gas slip stream 570 can also be introduced into the thermal oxidizing section 800.

The inlet temperature of the thermal oxidizing section 800 is typically in the range of −30-500° C. with a pressure of −1 kPa(g) to 3000 kPa(g). The outlet temperature is typically in the range of 650-1300° C. with a pressure of −1 kPa(g) to 50 kPa(g). The residence time in the thermal oxidizing section 800 is between 0.5 and 2 seconds. Any suitable thermal oxidizing section 800 could be used, including, but not limited to, an adiabatic thermal oxidizer chamber. The thermal oxidizing section 800 can be forced draft, induced draft, or a combination of both. The inlet temperature of the optional SNCR section is typically in the range of 650-1300° C. with a pressure of −1 kPa(g) to 50 kPa(g). The outlet temperature is typically in the range of 650-1040° C. with a pressure of −1 kPa(g) to 50 kPa(g). The residence time in the SNCR section is between 0.2 and 1 seconds. The thermal oxidation step would be separated from the SNCR step via a choke wall in the vessel.

The flue gas stream 845 from the thermal oxidizing section 800 comprises one or more of $H_2O$, $CO_2$, $N_2$, $O_2$, SOx, NOx, HCl, $Cl_2$, dioxins, and furans. The flue gas stream 845 is sent to the optional waste heat recovery section 805. Boiler feed water or oil stream 850 enters the optional waste heat recovery section 805 where a portion is converted to steam or hot oil stream 855, with the remainder exiting as blowdown water or oil 860. The inlet temperature of the optional waste heat recovery section 805 is typically in the range of 650-1300° C. with a pressure of −2 kPa(g) to 50 kPa(g). The outlet temperature is typically in the range of 200-400° C. with a pressure of −2 kPa(g) to 50 kPa(g).

Suitable waste heat recovery apparatus and methods are described above. The recovered waste heat in steam or hot oil stream 855 can be in the form of low, medium, or high pressure saturated or superheated steam, hot oil, and/or electricity. The recovered waste heat in steam or hot oil stream 855 can be used to supply heat to reboilers in the amine treatment unit, the fractionation column(s), and steam for the stripper column, or elsewhere in the plant, or for other heat requirements.

The flue gas stream 865 from the optional waste heat recovery section 805 is sent to the SOx removal section which may comprise reaction section 810 and filtration section 815 to convert at least one of SOx, HCl, and $Cl_2$. The inlet temperature of the reaction section 810 is typically in the range of 200-400° C. with a pressure of −3 kPa(g) to 50 kPa(g). The outlet temperature is typically in the range of 200-400° C. with a pressure of −3 kPa(g) to 50 kPa(g). Fresh sorbent 870 and optionally recycled sorbent 875, (comprising a mixture of one or more NaCl, $Na_2CO_3$, $Na_2SO_4$, $CaCl_2$, $CaSO_4$, $CaCO_3$, $MgCl_2$, $MgCO_3$, $MgSO_4$, and $MgCO_3$, depending on the compounds used in the reactant used, as discussed below) can be added to the flue gas stream 865. For example, the SOx removal section 810 may contain a reactant, such as $NaHCO_3$, $NaHCO_3.Na_2CO_3.2(H_2O)$, $CaCO_3$, $Ca(OH)_2$, and $Mg(OH)_2$, which reacts with the SOx, NOx and HCl to form NaCl, $Na_2CO_3$, $Na_2SO_4$, $NaNO_3$, $CaCl_2$, $CaSO_4$, $CaCO_3$, $MgCl_2$, $MgCO_3$, $MgSO_4$ and $Mg(NO_3)_2$, dioxins and furans. The reaction section flue gas stream 880 has a less HCl, SOx, and NOx compared to the incoming flue gas stream 865. The reaction section flue gas stream 880 comprises one or more of $H_2O$, $CO_2$, $N_2$, $O_2$, NaCl, $Na_2CO_3$, $Na_2SO_4$, $NaNO_3$, $CaCl_2$, $CaSO_4$, $CaCO_3$, $Ca(NO_3)_2$, $MgCl_2$, $MgCO_3$, $MgSO_4$, $Mg(NO_3)_2$, $Cl_2$, NOx, dioxins, and furans.

The reaction section flue gas stream 880 is combined with a quench stream 885 comprising air, and/or water, and/or quenched flue gas. The temperature of the reaction section flue gas stream 880 is typically reduced from 200-400° C. with a pressure of −4 kPa(g) to 50 kPa(g) to 150-250° C. with a pressure of −4 kPa(g) to 50 kPa(g). The quenched reaction section flue gas stream 880 is sent to the filtration section 815 for removal of the $Na_2CO_3$, $Na_2SO_4$, and NaCl. The inlet temperature of the filtration section 815 is typically in the range of 150-350° C. with a pressure of −5 kPa(g) to 50 kPa(g). The outlet temperature is typically in the range of 150-350° C. with a pressure of −5 kPa(g) to 50 kPa(g). The filtration section 815 comprises a bag filter, and/or a ceramic filter, and/or an electrostatic precipitator (ESP). An instrument air purge or high voltage DC 890 is introduced into the filtration section 815. In the case of the instrument air purge, it purges the retained material from the filter. In the case of the high voltage stream, it charges the cathodes of the ESP. The particulate is removed from the ESP by vibration. Dry residue stream 895 comprising one or more of NaCl, $Na_2CO_3$, $Na_2SO_4$, $NaNO_3$, $CaCl_2$, $CaSO_4$, $Ca_2CO_3$, $Ca(NO_3)_2$ $MgCl_2$, $MgCO_3$, $MgSO_4$, and $Mg(NO_3)_2$ exits the filtration section 815. The filtered flue gas stream 900 comprises one or more of $H_2O$, $CO_2$, $N_2$, $O_2$, NOx, dioxins, and furans.

If NOx is present in the filtered flue gas stream 900, the filtered flue gas stream 900 is sent to the optional NOx removal section 820 to remove NOx as discussed above. The inlet temperature of the NOx removal section 820 is typically in the range of 150-300° C. with a pressure of −6 kPa(g) to 50 kPa(g). The outlet temperature is typically in the range of 200-350° C. with a pressure of −6 kPa(g) to 50 kPa(g). For example, the NOx removal section 820 can be a selective catalytic reduction (SCR) section in which an ammonia and/or urea stream 905 are introduced into the SCR section where it reacts with the NOx and forms $N_2$ and $H_2O$. Any suitable SCR catalyst could be used, including but not limited to, ceramic carrier materials such as titanium oxide with active catalytic components such as oxides of base metals including $TiO_2$, $WO_3$ and $V_2O_5$, or an activated carbon based catalyst. The de-NOx outlet flue gas stream 910 consists essentially of one or more of $H_2O$, $CO_2$, $N_2$, $O_2$, dioxins, and furans.

If there are any halogens present in the feed, this may result in the formation of dioxin and/or furans. These compounds must be removed before the gases can be vented to the atmosphere. If dioxins and/or furans are present in the filtered flue gas stream 900 or the de-NOx outlet flue gas stream 910, the filtered flue gas stream 900 or the de-NOx outlet flue gas stream 910 is sent to the optional dioxin-furan removal section 825 for removal of the dioxin and/or furan. The dioxin and furans can be removed using a catalyst, or by co-injecting activated carbon. With the catalyst, the dioxin and furans react the catalyst, such as a catalyst containing e.g., $TiO_2$, $WO_3$ and $V_2O_5$, to form trace amounts of $CO_2$, $H_2O$, and HCl. In the case of the activated carbon, it would be co-injected with the dry sorbent 871 upstream of the SOx removal section 810. The dioxins and/or furan would be adsorbed on the carbon, and removed from via dry residue stream 895. The inlet temperature of the dioxin-furan removal section 825 is typically in the range of 150-250° C. with a pressure of −7 kPa(g) to 50 kPa(g). The outlet temperature is typically in the range of 150-250° C. with a pressure of −7 kPa(g) to 50 kPa(g). The treated outlet flue gas stream 915, consisting essentially of one or more of $H_2O$, $CO_2$, $N_2$, and $O_2$, can be vented to the atmosphere.

If the filtered flue gas stream 900 does not contain NOx, dioxin, or furans, the optional NOx removal section 820 and optional dioxin-furan removal section 825 are not present. The filtered flue gas stream 920, consisting essentially of one or more of $H_2O$, $CO_2$, $N_2$, and $O_2$, can be vented to the atmosphere.

If the filtered flue gas stream 900 contains NOx, but no dioxin or furans, the optional dioxin-furan removal section 825 is not present. The de-NOx outlet flue gas stream 925, consisting essentially of one or more of $H_2O$, $CO_2$, $N_2$, and $O_2$, can be vented to the atmosphere.

If the filtered flue gas stream 900 contains dioxin or furans, but not NOx, the optional NOx removal section 820 is not present. The filtered flue gas stream 900 is sent to the optional dioxin-furan removal section 825. The treated outlet flue gas stream 915, consisting essentially of one or more of $H_2O$, $CO_2$, $N_2$, and $O_2$, can be vented to the atmosphere.

If the flue gas stream 845 does not contain SOx, NOx, dioxins, or furans, the optional reaction section 810, the optional filtration section 815, the optional NOx removal section 820, and the optional dioxin-furan removal section 825 are not present. The flue gas stream 930 from the waste heat recovery section 805, consisting essentially of one or more of $H_2O$, $CO_2$, $N_2$, and $O_2$, can be vented to the atmosphere.

Figure 8:
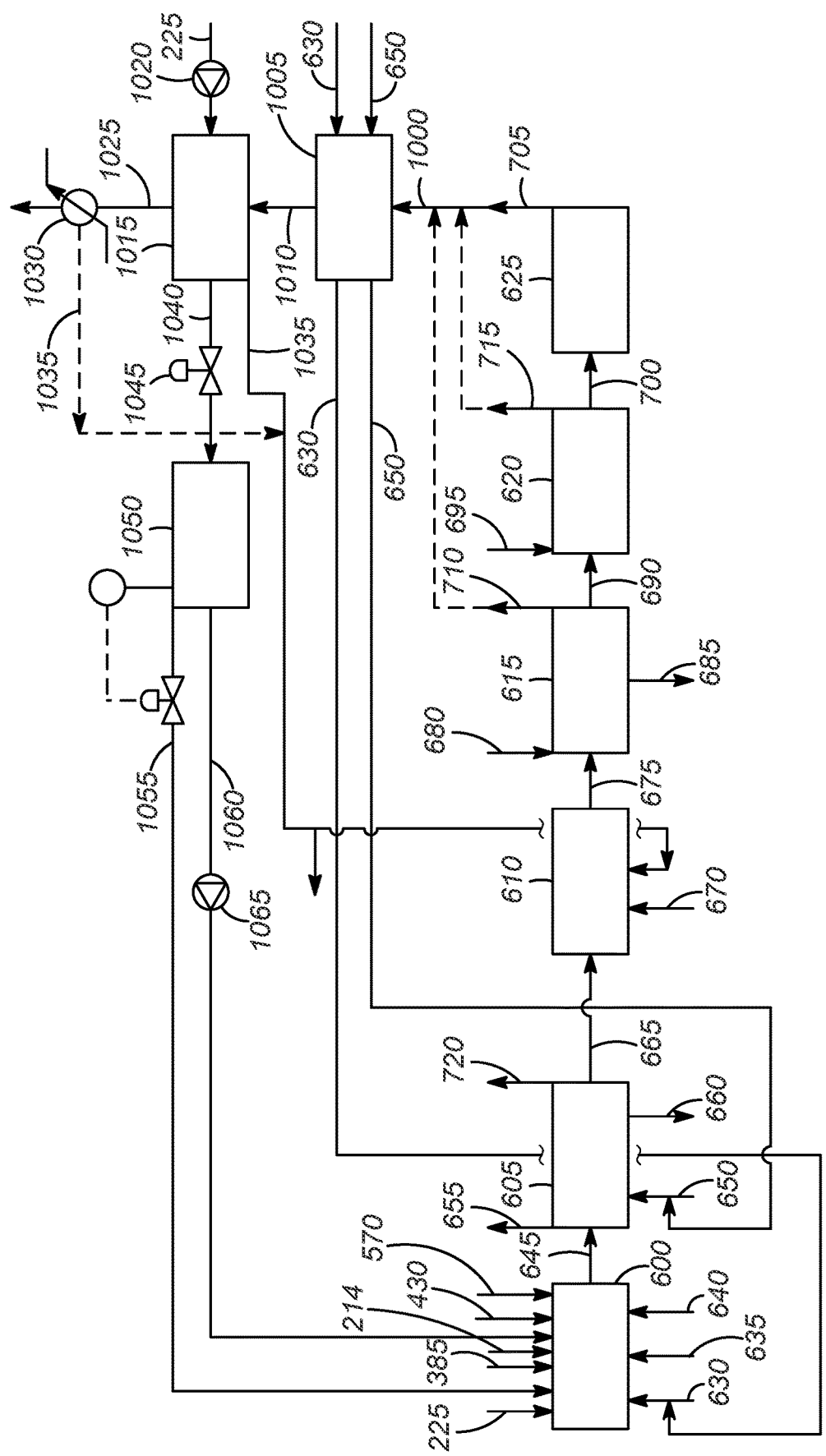
FIG. 8 is an illustration of one embodiment of the thermal oxidation system of FIG. 6 with improved energy recovery.

FIG. 8 illustrates an embodiment of the thermal oxidation system 555 of FIG. 6 with improved energy recovery. In this embodiment, energy can be recovered from the exhaust vapor stream 1000 by condensing the water in the exhaust vapor stream 1000. The condensate stream can be used as process water for other parts of the process, in some cases after treatment like neutralization and/or deaeration and/or filtration.

The exhaust vapor stream 1000 may be sent to an optional secondary heat exchanger 1005. The exhaust vapor stream 1000 can be the treated outlet flue gas stream 705, the de-NOx outlet flue gas stream 715, or the de-SOX outlet flue gas stream 710. The exhaust vapor stream 1000 is sent to the second side of the secondary heat exchanger 1005.

A process stream is sent to the first side of the secondary heat exchanger 1005. There can be one or more secondary heat exchangers 1005, depending on temperature of the exhaust vapor stream 1000 and the number of process streams that are to be heated.

The process stream can be all or a portion of the combustion air stream 630, and/or all or a portion of the boiler feed water or oil stream 650.

The process stream is heated by the heat exchange with the exhaust vapor stream 1000 which is cooled as a result to form a first cooled exhaust vapor stream 1010.

The heated combustion air stream 630 is sent to the thermal oxidizing section 600, while the heated boiler feed water or oil stream 650 would be sent to the waste heat recovery section 605 thereby increasing the steam generation or hot oil generation efficiency.

The first cooled exhaust vapor stream 1010 from the secondary heat exchanger 1005 is sent to the primary heat exchanger 1015.

A sour water stream 225 is passed through the first side of the primary heat exchanger 1015. There can be one or more primary heat exchangers 1015 depending on the temperature of the exhaust vapor stream 1000 or first cooled exhaust vapor stream 1010.

The sour water stream 225 can optionally be compressed in a pump and/or compressor 1020 from a pressure of about 0-75 psig to a pressure of about 100-400 psig, for example, before it is introduced into the primary heat exchanger 1015 to avoid flashing and/or boiling in the primary heat exchanger 1015.

The first cooled exhaust vapor stream 1010 is sent to the primary heat exchanger 1015 where it is passed through the second side of the primary heat exchanger 1015. Alternatively, in the absence of the secondary heat exchanger 1005, exhaust vapor stream 1000 is sent directly to the primary heat exchanger 1015.

The first cooled exhaust vapor stream 1010 entering the primary heat exchanger 1015 has a temperature above the dew point. The heat exchange with the sour water stream 225 lowers the temperature of the first cooled exhaust vapor stream 1010. In some cases, the temperature will be lowered to a temperature at or below the dew point which results in condensation of the water out the first cooled exhaust vapor stream 1010. The resulting second cooled exhaust vapor stream 1025 can be sent to an exhaust stack and released to the atmosphere.

In other cases, the temperature will not be lowered sufficiently to condense water (any, most, or all) from the first cooled exhaust vapor stream 1010. In this case, an optional third heat exchanger 1030 can be used to lower the temperature of the second cooled exhaust vapor stream 1025 to a temperature at or below the dew point leading to the formation of water condensate. The cooling medium for the third heat exchanger can be cold/ambient air or cold water, for example.

The water condensate is recovered and exits the primary heat exchanger 1015 and/or the third heat exchanger as condensate stream 1035. Condensate stream 1035 can be sent to quench section 610 as quench stream 670 or used in other processes.

The heated sour water stream 1040 from the primary heat exchanger 1015 is sent through valve 1045 (e.g., throttling or let down valve) to reduce the pressure and to flash tank 1050, which is at lower pressure (e.g., at a pressure of about 1-20 psig) than the primary heat exchanger 1015. When the higher pressure heated sour water stream 1040 enters the lower pressure flash tank 1050, it is flashed into a vapor stream 1055 and a liquid stream 1060. The vapor stream 1055 and liquid stream 1060 are sent to the thermal oxidizing section 600 of the thermal oxidation system 555. There can be an optional pump and/or compressor 1065 on the line for the liquid stream 1060.

Figure 9:
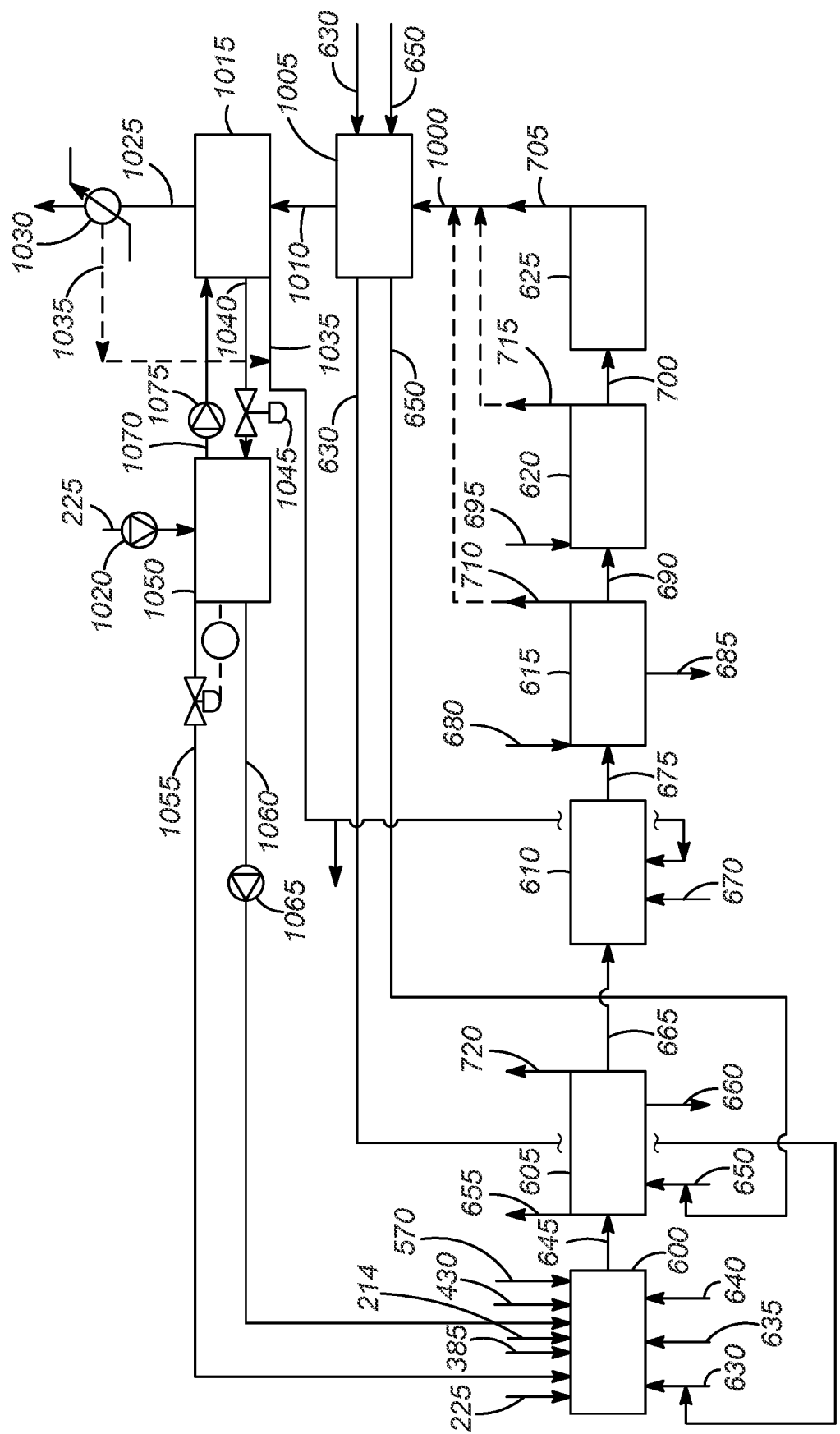
FIG. 9 is an illustration of another embodiment of the thermal oxidation system of FIG. 6 with improved energy recovery.

FIG. 9 illustrates an alternate energy recovery system for the thermal oxidation system 555 of FIG. 6. In this arrangement, the sour water stream 225 (with optional compression in a pump and/or compressor 1020) is sent to the flash tank 1050 for an initial flash separation. A portion 1070 of the liquid from the flash tank 1050 may be compressed in an optional pump and/or compressor 1075 and sent to the first side of the primary heat exchanger 1015. The heated sour water stream 1040 is then passed through valve 1045 to reduce the pressure and returned to the flash tank 1050 where further separation takes place.

Water is recycled from the flash tank 1050 to the primary heat exchanger 1015 and back. The ratio of the sour water feed to the flash tank to the recycle rate (i.e., the flow rate from the flash tank to the primary heat exchanger and back) is about 1:2 to 1:10.

This process is designed to minimize the time the sour water stream 225 spends in the primary heat exchanger 1015 to avoid the formation of steam in the primary heat exchanger 1015.

Figure 10:
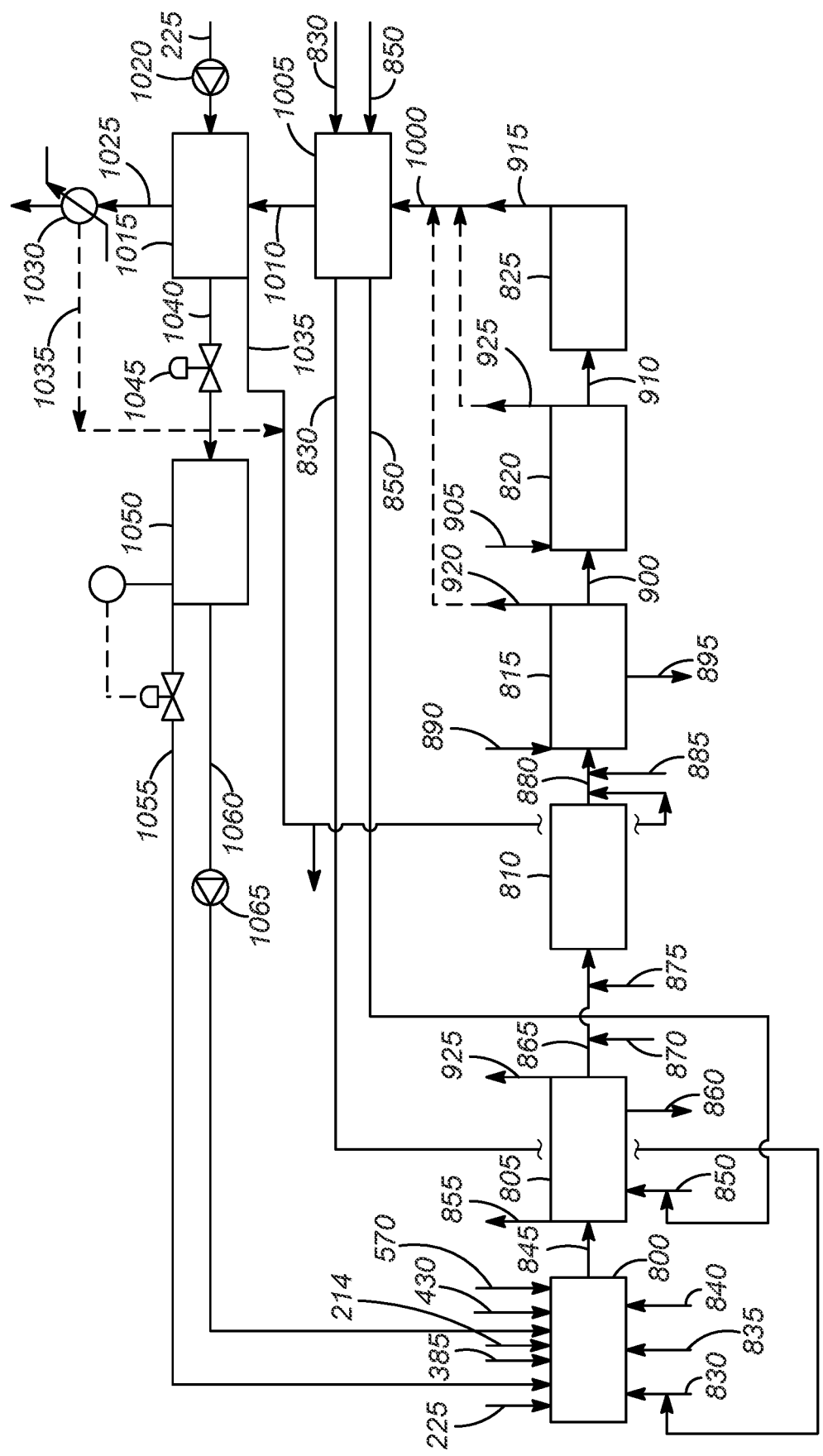
FIG. 10 is an illustration of one embodiment of the thermal oxidation system of FIG. 7 with improved energy recovery.

FIG. 10 shows a similar energy recovery system for the thermal oxidizing system of FIG. 7. In this embodiment, the exhaust vapor stream 1000 can be the treated outlet flue gas stream 915, the de-NOx outlet flue gas stream 925, or the filtered flue gas stream 920.

The exhaust vapor stream 1000 may be sent to the second side of an optional secondary heat exchanger 1005. A process stream is sent to the first side of the secondary heat exchanger 1005. There can be one or more secondary heat exchangers 1005, depending on temperature of the exhaust vapor stream and the number of process streams that are to be heated.

The process stream can be all or a portion of the combustion air stream 830, and/or the boiler feed water or oil stream 850.

The process stream is heated by the heat exchange with the exhaust vapor stream 1000 which is cooled as a result. The heated combustion air stream 830 is sent to the thermal oxidizing section 800, while the heated boiler feed water or oil stream 850 would be sent to the waste heat recovery section 805 thereby increasing the steam generation or hot oil generation efficiency.

The sour water stream 225 is passed through the first side of a primary heat exchanger 1015. There can be one or more primary heat exchangers 1015. The sour water stream 225 can optionally be compressed in a pump and/or compressor 1020 before it is introduced into the primary heat exchanger 1015.

The first cooled exhaust vapor stream 1010 is passed through the second side of the primary heat exchanger 1015. Alternatively, in the absence of the secondary heat exchanger 1005, exhaust vapor stream 1000 is sent to the primary heat exchanger 1015.

The first cooled exhaust vapor stream 1010 entering the primary heat exchanger 1015 has a temperature above the dew point. The heat exchange with the sour water stream 225 lowers the temperature of the first cooled exhaust vapor stream 1010. In some cases, the temperature will be lowered to a temperature at or below the dew point which results in condensation of the water out of the first cooled exhaust vapor stream 1010. The resulting second cooled exhaust vapor stream 1025 can be sent to an exhaust stack and released to the atmosphere.

In other cases, the temperature will not be lowered sufficiently to condense water (any, most, or all) from the first cooled exhaust vapor stream 1010. In this case, an optional third heat exchanger 1030 can be used to lower the temperature of the second cooled exhaust vapor stream 1025 to a temperature at or below the dew point leading to the formation of condensate. The cooling medium for the third heat exchanger 1030 can be cold/ambient air or cold water, for example.

The condensate is recovered and exits the primary heat exchanger 1015 and/or the third heat exchanger 1030 as condensate stream 1035. Condensate stream 1035 can be used as quench stream 885 or used in other processes.

The heated sour water stream 1040 is sent through valve 1045 to reduce the pressure and then to flash tank 1050, which is at lower pressure (e.g., at a pressure of about 1-20 psig) than the primary heat exchanger 1015. When the higher pressure heated sour water stream 1040 enters the lower pressure flash tank 1050, it is flashed into a vapor stream 1055 and a liquid stream 1060. The vapor stream 1055 and liquid stream 1060 are sent to the thermal oxidizing section 800 of the thermal oxidation system 555'. There can be an optional pump and/or compressor 1065 on the line for the liquid stream 1060.

Figure 11:
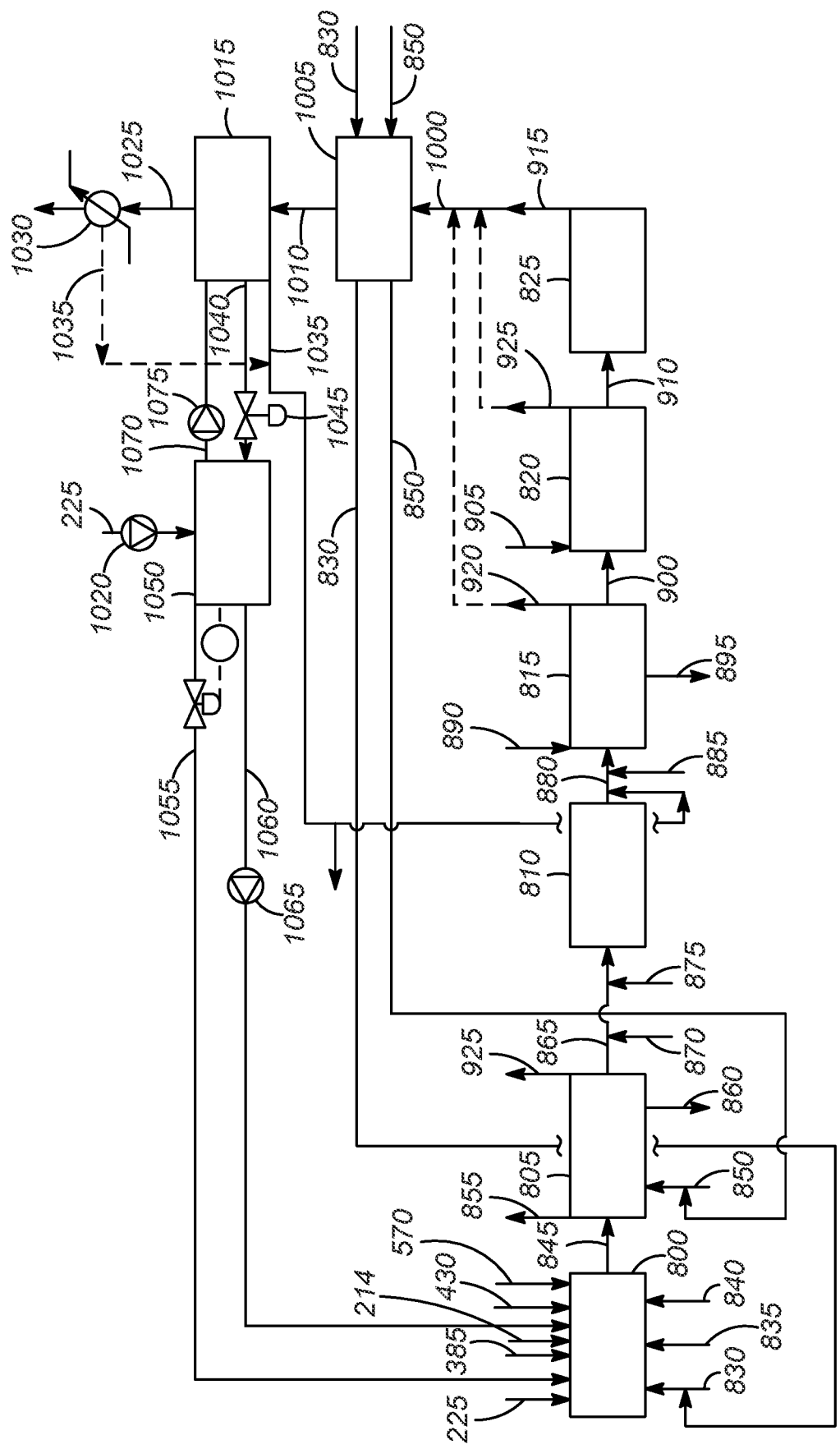
FIG. 11 is an illustration of another embodiment of the thermal oxidation system of FIG. 7 with improved energy recovery.

FIG. 11 illustrates the alternate arrangement in which the sour water stream 225 is initially sent to the flash tank 1050.

As used herein, the terms "unit," "zone," and "section" can refer to an area including one or more equipment items as appropriate for the type of unit, zone, or section and/or one or more sub-zones or sub-sections. Equipment items can include, but are not limited to, one or more reactors or reactor vessels, separation vessels, adsorbent chamber or chambers, distillation towers, heaters, exchangers, pipes, pumps, compressors, and controllers. Additionally, an equipment item, such as a reactor, dryer, adsorbent chamber or vessel, can further include one or more sections, sub-sections, zones, or sub-zones.

Specific Embodiments

While the following is described in conjunction with specific embodiments, it will be understood that this description is intended to illustrate and not limit the scope of the preceding description and the appended claims.

A first embodiment of the invention is a process for treating acid gas and sour water effluent streams in a process for producing renewable transportation fuel comprising thermally oxidizing at least one of a sour water stream from a cold separation and fractionation section of the renewable transportation fuel process and an amine acid gas stream from an acid gas treatment section of the renewable transportation fuel process in a thermal oxidation system, wherein the sour water stream is not treated in a sour water stripper unit before being thermally oxidized in the thermal oxidation system and the amine acid gas stream is not treated in a sulfur recovery unit before being thermally oxidized in the thermal oxidation system, and wherein thermally oxidizing the at least one of the sour water stream and the amine acid gas stream comprises thermally oxidizing the at least one of the sour water stream and the amine acid gas stream in a thermal oxidizing section forming a flue gas stream consisting essentially of at least one of $H_2O$, $CO_2$, $N_2$, $O_2$, SOx, NOx, HCl, $Cl_2$, dioxins, and furans; optionally recovering waste heat from the flue gas stream in a waste heat recovery section; removing at least one of SOx, HCl, and $Cl_2$ from the flue gas stream in a SOx removal section to form a de-SOx outlet flue gas stream consisting essentially of at least one of $H_2O$, $CO_2$, $N_2$, $O_2$, NOx, dioxins, and furans, wherein removing the at least one of SOx, HCl, and $Cl_2$ from the flue gas stream comprises quenching the flue gas stream in a quench section to form a quenched flue gas stream; and contacting a caustic solution or an $NH_3$ based solution with the quenched flue gas stream in a scrubbing section to form the de-SOx outlet flue gas stream and a liquid stream comprising at least one of $H_2O$, $Na_2SO_3$, $Na_2SO_4$, $NaHSO_3$, $Na_2CO_3$, NaCl, $(NH_4)_2SO_4$, and $NH_4Cl$; or reacting the flue gas stream with a reactant in an SOx reaction section to form a reaction section flue gas stream consisting essentially of at least one of $H_2O$, $CO_2$, $N_2$, $O_2$, NaCl, $Na_2CO_3$, $Na_2SO_4$, $NaNO_3$, $CaCl_2$, $CaSO_4$, $CaCO_3$, $Ca(NO_3)_2$, $MgCl_2$, $MgCO_3$, $MgSO_4$, $Mg(NO_3)_2$, $Cl_2$, NOx, dioxins, and furans, wherein the reactant comprises at least one of $NaHCO_3$, $NaHCO_3.Na_2CO_3.2(H_2O)$, $CaCO_3$, $Ca(OH)_2$, and $Mg(OH)_2$; and filtering the reaction section flue gas stream in a filtration section to remove NaCl, $Na_2CO_3$, $Na_2SO_4$, $NaNO_3$, $CaCl_2$, $CaSO_4$, $CaCO_3$, $Ca(NO_3)_2$, $MgCl_2$, $MgCO_3$, $MgSO_4$, and $Mg(NO_3)_2$ to form the de-SOx outlet flue gas stream; optionally removing NOx from the de-SOx outlet flue gas stream in an NOx removal section to form a de-NOx outlet flue gas stream consisting essentially of at least one of $H_2O$, $CO_2$, $N_2$, $O_2$, dioxins, and furans; and optionally removing dioxin, furan, or both from the de-SOx outlet flue gas stream or the de-NOx outlet flue gas stream in a dioxin-furan removal section to form a treated outlet flue gas stream consisting essentially of at least one of $H_2O$, $CO_2$, $N_2$, and $O_2$. An embodiment of the invention is one, any or all of prior embodiments in this paragraph up through the first embodiment in this paragraph wherein the sour water stream comprises at least one of a cold separator sour water stream from a cold separator in the cold separation and fractionation section, a de-butanizer receiver sour water stream from a de-butanizer in the cold separation and fractionation section, and a stripper receiver sour water stream from a stripper receiver in the cold separation and fractionation section. An embodiment of the invention is one, any or all of prior embodiments in this paragraph up through the first embodiment in this paragraph wherein the amine acid gas stream comprises a regenerator amine acid gas stream from a common amine regenerator overhead condenser and reflux drum. An embodiment of the invention is one, any or all of prior embodiments in this paragraph up through the first embodiment in this paragraph further comprising at least one of contacting a first portion of a lean amine stream with an acid recycle gas stream from a cold separator in the cold separation and fractionation section in a recycle gas amine contactor to form a first portion of a rich amine stream; contacting a first portion of a lean amine stream with an acid liquefied petroleum gas (LPG) stream from a de-butanizer receiver vessel in the cold separation and fractionation section in a de-butanizer receiver amine contactor to form a second portion of a rich amine stream; and contacting a third portion of a lean amine stream with a lean acid gas stream from a sponge absorber in the cold separation and fractionation section in a sponge absorber lean gas overhead amine contactor to form a third portion of a rich amine stream; regenerating at least one of the first, second, and third portions of the rich amine stream in the common amine regenerator to form the lean amine stream and an overhead regenerator amine acid gas stream; separating the overhead amine acid gas stream into the regenerator amine acid gas stream and a reflux liquid stream in an amine regenerator overhead condenser; and refluxing the reflux liquid stream to the common amine regenerator. An embodiment of the invention is one, any or all of prior embodiments in this paragraph up through the first embodiment in this paragraph further comprising separating a purge stream from an acid recycle gas stream from a cold separator in the cold separation and fractionation section in a pressure swing adsorption unit into a recycle hydrogen stream and a PSA tail gas stream, combining the recycle hydrogen stream with the acid recycle gas stream, and introducing the PSA tail gas stream into the thermal oxidation system as fuel; contacting a second portion of a lean amine stream with an acid liquefied petroleum gas (LPG) stream from a de-butanizer receiver vessel in the cold separation and fractionation section in a de-butanizer receiver amine contactor to form a second portion of a rich amine stream; and contacting a third portion of a lean amine stream with a lean acid gas stream from a sponge absorber in the cold separation and fractionation section in a sponge absorber lean gas overhead amine contactor to form a third portion of a rich amine stream; regenerating at least one of the second and third portions of the rich amine stream in the common amine regenerator to form the lean amine stream and an overhead regenerator amine acid gas stream; separating the overhead amine acid gas stream into the regenerator amine acid gas stream and a reflux liquid stream in an amine regenerator overhead condenser; and refluxing the reflux liquid stream to the common amine regenerator. An embodiment of the invention is one, any or all of prior embodiments in this paragraph up through the first embodiment in this paragraph further comprising preheating the sour water stream before thermally oxidizing the sour water stream using steam from the process for producing renewable transportation fuel or from recovered heat from the waste heat recovery section. An embodiment of the invention is one, any or all of prior embodiments in this paragraph up through the first embodiment in this paragraph further comprising introducing a renewable feedstock to a guard bed to remove contaminants comprising one or more of alkali metals, oxygen compounds, sulfur compounds, and nitrogen compounds from the renewable feedstock; treating a renewable feedstock to remove additional oxygen compounds from the renewable feedstock; contacting the renewable feedstock with a hydroisomerization catalyst, a hydrocracking catalyst, or both in the presence of hydrogen under hydroisomerization and hydrocracking conditions in a hydroisomerization and hydrocracking section to form a reaction effluent; and separating and fractionating the reaction effluent in the cold separation and fractionation section to form at least one renewable transportation fuel. An embodiment of the invention is one, any or all of prior embodiments in this paragraph up through the first embodiment in this paragraph wherein separating and fractionating the reaction effluent comprises separating the reactor effluent in a cold separator into a liquid hydrocarbon stream, a cold separator recycle acid gas stream, and a cold separator sour water stream; stripping the liquid hydrocarbon stream into a stripper overhead stream and a stripper bottom stream; separating the stripper overhead stream in a stripper receiver into a stripper receiver liquid stream, a stripper receiver off-gas stream, and a stripper receiver sour water stream; contacting the stripper receiver off-gas stream with a sponge absorber forming a sponge absorber liquid stream and a lean acid gas stream; separating the stripper receiver liquid stream and optionally the sponge absorber liquid stream in a de-butanizer column into de-butanizer overhead stream, a de-butanizer bottom stream; separating the de-butanizer overhead stream in a de-butanizer receiver into an acid liquefied petroleum gas (LPG) stream, a de-butanizer receiver sour water stream, and a reflux stream; and fractionating the stripper bottom stream into at least one of a renewable jet fuel stream, a renewable diesel fuel stream, and a naphtha stream. An embodiment of the invention is one, any or all of prior embodiments in this paragraph up through the first embodiment in this paragraph wherein the sour water stream comprises at least one of the cold separator sour water stream, stripper receiver sour water stream, and the de-butanizer receiver sour water stream. An embodiment of the invention is one, any or all of prior embodiments in this paragraph up through the first embodiment in this paragraph further comprising at least one of contacting a first portion of a lean amine stream with the cold separator acid recycle gas stream in a recycle gas amine contactor to form a first portion of a rich amine stream; contacting a second portion of the lean amine stream with the acid LPG stream from the de-butanizer receiver in a de-butanizer receiver amine contactor to form a second portion of the rich amine stream; and contacting a third portion of the lean amine stream with the lean acid gas stream from the sponge absorber in a sponge absorber overhead amine contactor to form a third portion of the rich amine stream; regenerating at least one of the first, second, and third portions of the rich amine stream in a common amine regenerator to form the lean amine stream and an overhead amine acid gas stream; separating the overhead amine acid gas stream into the amine acid gas stream and a reflux liquid stream in an amine regenerator overhead condenser; and refluxing the reflux liquid stream to the common amine regenerator. An embodiment of the invention is one, any or all of prior embodiments in this paragraph up through the first embodiment in this paragraph wherein quenching the flue gas stream comprises quenching the flue gas stream with at least one of air, the quenched flue gas stream, the de-SOx outlet flue gas stream, the de-NOx outlet flue gas stream, the treated outlet flue gas stream, and water. An embodiment of the invention is one, any or all of prior embodiments in this paragraph up through the first embodiment in this paragraph further comprising introducing an uncompressed pressure swing adsorption (PSA) tail gas stream from a PSA unit connected to a hydrogen production plant to the thermal oxidation system as a fuel source. An embodiment of the invention is one, any or all of prior embodiments in this paragraph up through the first embodiment in this paragraph further comprising introducing a slip stream of a lean acid gas stream from a sponge absorber to the thermal oxidation system as a fuel source. An embodiment of the invention is one, any or all of prior embodiments in this paragraph up through the first embodiment in this paragraph further comprising passing the sour water stream through a first side of a primary heat exchanger; passing an exhaust vapor stream from the thermal oxidation system through a second side of the primary heat exchanger, wherein the exhaust vapor stream comprises the treated outlet flue gas stream, the de-NOx outlet flue gas stream, or the de-SOX outlet flue gas stream; transferring heat from the exhaust vapor stream to the sour water stream, cooling the exhaust vapor stream forming a cooled exhaust vapor stream and heating the sour water stream forming a heated sour water stream; reducing a pressure of the heated sour water stream; passing the reduced pressure heated sour water stream to a flash tank having a pressure lower than a pressure in the primary heat exchanger, forming a vapor stream and a liquid stream; passing the vapor stream and the liquid stream to the thermal oxidizing section of the thermal oxidation system; and passing the cooled exhaust stream to an exhaust stack. An embodiment of the invention is one, any or all of prior embodiments in this paragraph up through the first embodiment in this paragraph further comprising passing a process stream through a first side of a secondary heat exchanger, wherein the process stream is at least one of a combustion air stream and a boiler feed water or oil stream; passing the exhaust vapor stream to a second side of the secondary heat exchanger before passing the exhaust vapor stream to the primary heat exchanger to reduce a temperature of the exhaust vapor stream and to heat the at least one process stream and form a second cooled exhaust vapor stream and at least one of a heated combustion air stream, and a heated boiler feed water or oil stream; passing the second cooled exhaust vapor stream to the primary heat exchanger and wherein passing the exhaust vapor stream from the thermal oxidation system through the second side of the primary heat exchanger comprises passing the second cooled exhaust vapor stream through a second side of the primary heat exchanger; and at least one of passing the heated combustion air stream to the thermal oxidizing section of the thermal oxidation system; and passing the heated boiler feed water or oil stream to the waste heat recovery section. An embodiment of the invention is one, any or all of prior embodiments in this paragraph up through the first embodiment in this paragraph further comprising introducing the sour water stream to the flash tank forming a liquid and a vapor before passing the sour water stream to the primary heat exchanger; and compressing at least a portion of the liquid; wherein passing the sour water stream through the first side of the primary heat exchanger comprises passing the portion of the compressed liquid from the flash tank to the primary heat exchanger; wherein reducing the pressure of the heated sour water stream comprises reducing the pressure of the heated compressed liquid from the primary heat exchanger; and wherein passing the reduced pressure heated sour water stream to the flash tank comprises passing the reduced pressure heated compressed liquid to the flash tank. An embodiment of the invention is one, any or all of prior embodiments in this paragraph up through the first embodiment in this paragraph wherein the exhaust vapor stream is cooled in the primary heat exchanger to a temperature at or below a dew point to condense water from the exhaust vapor stream, forming a first condensate stream. An embodiment of the invention is one, any or all of prior embodiments in this paragraph up through the first embodiment in this paragraph further comprising passing the first condensate stream to the quench section. An embodiment of the invention is one, any or all of prior embodiments in this paragraph up through the first embodiment in this paragraph wherein the cooled exhaust vapor stream is passed to a third heat exchanger before being passed to the exhaust stack, and wherein the cooled exhaust vapor stream is further cooled in the third heat exchanger to a temperature at or below a dew point to condense water from the cooled exhaust vapor stream, forming a second condensate stream. An embodiment of the invention is one, any or all of prior embodiments in this paragraph up through the first embodiment in this paragraph further comprising passing the second condensate stream to the quench section. An embodiment of the invention is one, any or all of prior embodiments in this paragraph up through the first embodiment in this paragraph further comprising compressing the sour water stream before passing the sour water stream to the primary heat exchanger.

A second embodiment of the invention is a process for treating acid gas and sour water effluent streams in a process for producing renewable transportation fuel comprising introducing a renewable feedstock to a guard bed to remove contaminants comprising one or more of alkali metals, oxygen compounds, sulfur compounds, and nitrogen compounds from the renewable feedstock; treating a renewable feedstock to remove additional oxygen compounds from the renewable feedstock; hydroisomerizing and hydrocracking the renewable feedstock to form a reaction effluent; separating the reactor effluent in a cold separator into a liquid hydrocarbon stream, a cold separator recycle acid gas stream, and a cold separator sour water stream; stripping the liquid hydrocarbon stream into a stripper overhead stream and a stripper bottom stream; separating the stripper overhead stream in a stripper receiver into a stripper receiver liquid stream, a stripper receiver off-gas stream, and a stripper receiver sour water stream; contacting the stripper receiver off-gas stream with a sponge absorber forming a sponge absorber liquid stream and a lean acid gas stream; separating the stripper receiver liquid stream and optionally the sponge absorber liquid stream in a de-butanizer column into de-butanizer overhead stream, a de-butanizer bottom stream; separating the de-butanizer overhead stream in a de-butanizer receiver into an acid liquefied petroleum gas (LPG) stream, a de-butanizer receiver sour water stream, and a reflux stream; fractionating the stripper bottom stream into at least one of a renewable jet fuel stream, a renewable diesel fuel stream, and a naphtha stream; at least one of contacting a first portion of a lean amine stream with the cold separator acid recycle gas stream in a recycle gas amine contactor to form a first portion of a rich amine stream; contacting a second portion of the lean amine stream with the acid LPG stream from the de-butanizer receiver in a de-butanizer receiver amine contactor to form a second portion of the rich amine stream; and contacting a third portion of the lean amine stream with the lean acid gas stream from the sponge absorber in a sponge absorber overhead amine contactor to form a third portion of the rich amine stream; regenerating at least one of the first, second, and third portions of the rich amine stream in a common amine regenerator to form the lean amine stream and an overhead amine acid gas stream; separating the overhead amine acid gas stream into an amine acid gas stream and a reflux liquid stream in an amine regenerator overhead condenser; refluxing the reflux liquid stream to the common amine regenerator; and thermally oxidizing at least one of a sour water stream from the cold separation and fractionation section and the amine acid gas stream in a thermal oxidation system, wherein the sour water stream is not treated in a sour water stripper unit before being thermally oxidized in the thermal oxidation system and the amine acid gas stream is not treated in a sulfur recovery unit before being thermally oxidized in the thermal oxidation system, and wherein the sour water stream comprises at least one of the cold separator sour water stream from the cold separator in the cold separation and fractionation section, the de-butanizer receiver sour water stream from the de-butanizer in the cold separation and fractionation section, and the stripper receiver sour water stream from the stripper receiver in the cold separation and fractionation section; and wherein thermally oxidizing the at least one of the sour water stream and the amine acid gas stream comprises thermally oxidizing the at least one of the sour water stream and the amine acid gas stream in a thermal oxidizing section forming a flue gas stream consisting essentially of at least one of $H_2O$, $CO_2$, $N_2$, $O_2$, SOx, NOx, HCl, $Cl_2$, dioxins, and furans; optionally recovering waste heat from the flue gas stream in a waste heat recovery section; removing at least one of SOx, HCl, and $Cl_2$ from the flue gas stream in a SOx removal section to form a de-SOx outlet flue gas stream consisting essentially of at least one of $H_2O$, $CO_2$, $N_2$, $O_2$, NOx, dioxins, and furans, wherein removing the at least one of SOx, HCl, and $Cl_2$ from the flue gas stream comprises quenching the flue gas stream in a quench section to form a quenched flue gas stream; and contacting a caustic solution or an $NH_3$ based solution with the quenched flue gas stream in a scrubbing section to form the de-SOx outlet flue gas stream and a liquid stream comprising at least one of $H_2O$, $Na_2SO_3$, $Na_2SO_4$, $NaHSO_3$, $Na_2CO_3$, NaCl, $(NH_4)_2SO_4$, and $NH_4Cl$; or reacting the flue gas stream with a reactant in an SOx reaction section to form a reaction section flue gas stream consisting essentially of at least one of $H_2O$, $CO_2$, $N_2$, $O_2$, NaCl, $Na_2CO_3$, $Na_2SO_4$, $NaNO_3$, $CaCl_2$, $CaSO_4$, $CaCO_3$, $Ca(NO_3)_2$, $MgCl_2$, $MgCO_3$, $MgSO_4$, $Mg(NO_3)_2$, $Cl_2$, NOx, dioxins, and furans, wherein the reactant comprises at least one of $NaHCO_3$, $NaHCO_3.Na_2CO_3.2(H_2O)$, $CaCO_3$, $Ca(OH)_2$, and $Mg(OH)_2$; and filtering the reaction section flue gas stream in a filtration section to remove NaCl, $Na_2CO_3$, $Na_2SO_4$, $NaNO_3$, $CaCl_2$, $CaSO_4$, $CaCO_3$, $Ca(NO_3)_2$, $MgCl_2$, $MgCO_3$, $MgSO_4$, and $Mg(NO_3)_2$ to form the de-SOx outlet flue gas stream; optionally removing NOx from the de-SOx outlet flue gas stream in an NOx removal section to form a de-NOx outlet flue gas stream consisting essentially of at least one of $H_2O$, $CO_2$, $N_2$, $O_2$, dioxins, and furans; and optionally removing dioxin, furan, or both from the de-SOx outlet flue gas stream or the de-NOx outlet flue gas stream in a dioxin-furan removal section to form a treated outlet flue gas stream consisting essentially of at least one of $H_2O$, $CO_2$, $N_2$, and $O_2$. An embodiment of the invention is one, any or all of prior embodiments in this paragraph up through the second embodiment in this paragraph further comprising preheating the sour water stream before thermally oxidizing the sour water stream using steam from the process for producing renewable transportation fuel or from recovered heat from the waste heat recovery section. An embodiment of the invention is one, any or all of prior embodiments in this paragraph up through the second embodiment in this paragraph wherein quenching the flue gas stream comprises quenching the flue gas stream with at least one of air, the quenched flue gas stream, the de-SOx outlet flue gas stream, the de-NOx outlet flue gas stream, the treated outlet flue gas stream, and water. An embodiment of the invention is one, any or all of prior embodiments in this paragraph up through the second embodiment in this paragraph further comprising introducing an uncompressed pressure swing adsorption (PSA) tail gas stream from a PSA unit connected to a hydrogen production plant to the thermal oxidation system as a fuel source. An embodiment of the invention is one, any or all of prior embodiments in this paragraph up through the second embodiment in this paragraph further comprising introducing a slip stream of a lean acid gas stream from a sponge absorber to the thermal oxidation system as a fuel source.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

What is claimed is:

1. A process for treating acid gas and sour water effluent streams in a process for producing renewable transportation fuel comprising:

thermally oxidizing at least one of a sour water stream from a cold separation and fractionation section of the renewable transportation fuel process and an amine acid gas stream from an acid gas treatment section of the renewable transportation fuel process in a thermal oxidation system, wherein the sour water stream is not treated in a sour water stripper unit before being thermally oxidized in the thermal oxidation system and the amine acid gas stream is not treated in a sulfur recovery unit before being thermally oxidized in the thermal oxidation system, and wherein thermally oxidizing the at least one of the sour water stream and the amine acid gas stream comprises:

thermally oxidizing the at least one of the sour water stream and the amine acid gas stream in a thermal oxidizing section forming a flue gas stream consisting essentially of at least one of $H_2O$, $CO_2$, $N_2$, $O_2$, SOx, NOx, HCl, $Cl_2$, dioxins, and furans;

optionally recovering waste heat from the flue gas stream in a waste heat recovery section;

removing at least one of SOx, HCl, and $Cl_2$ from the flue gas stream in a SOx removal section to form a de-SOx outlet flue gas stream consisting essentially of at least one of $H_2O$, $CO_2$, $N_2$, $O_2$, NOx, dioxins, and furans, wherein removing the at least one of SOx, HCl, and $Cl_2$ from the flue gas stream comprises:

quenching the flue gas stream in a quench section to form a quenched flue gas stream; and contacting a caustic solution or an $NH_3$ based solution with the quenched flue gas stream in a scrubbing section to form the de-SOx outlet flue gas stream and a liquid stream comprising at least one of $H_2O$, $Na_2SO_3$, $Na_2SO_4$, $NaHSO_3$, $Na_2CO_3$, NaCl, $(NH_4)_2SO_4$, and $NH_4Cl$;

or reacting the flue gas stream with a reactant in an SOx reaction section to form a reaction section flue gas stream consisting essentially of at least one of $H_2O$, $CO_2$, $N_2$, $O_2$, NaCl, $Na_2CO_3$, $Na_2SO_4$, $NaNO_3$, $CaCl_2$, $CaSO_4$, $CaCO_3$, $Ca(NO_3)_2$, $MgCl_2$, $MgCO_3$, $MgSO_4$, $Mg(NO_3)_2$, $Cl_2$, NOx, dioxins, and furans, wherein the reactant comprises at least one of $NaHCO_3$, $NaHCO_3.Na_2CO_3.2(H_2O)$, $CaCO_3$, $Ca(OH)_2$, and $Mg(OH)_2$; and filtering the reaction section flue gas stream in a filtration section to remove NaCl, $Na_2CO_3$, $Na_2SO_4$, $NaNO_3$, $CaCl_2$), $CaSO_4$, $CaCO_3$, $Ca(NO_3)_2$, $MgCl_2$, $MgCO_3$, $MgSO_4$, and $Mg(NO_3)_2$ to form the de-SOx outlet flue gas stream;

optionally removing NOx from the de-SOx outlet flue gas stream in an NOx removal section to form a de-NOx outlet flue gas stream consisting essentially of at least one of $H_2O$, $CO_2$, $N_2$, $O_2$, dioxins, and furans; and optionally removing dioxin, furan, or both from the de-SOx outlet flue gas stream or the de-NOx outlet flue gas stream in a dioxin-furan removal section to form a treated outlet flue gas stream consisting essentially of at least one of $H_2O$, $CO_2$, $N_2$, and $O_2$.

2. The process of claim 1 wherein the sour water stream comprises at least one of a cold separator sour water stream from a cold separator in the cold separation and fractionation section, a de-butanizer receiver sour water stream from a de-butanizer in the cold separation and fractionation section, and a stripper receiver sour water stream from a stripper receiver in the cold separation and fractionation section.

3. The process of claim 1 wherein the amine acid gas stream comprises a regenerator amine acid gas stream from a common amine regenerator overhead condenser and reflux drum.

4. The process of claim 3 further comprising:
at least one of:
contacting a first portion of a lean amine stream with an acid recycle gas stream from a cold separator in the cold separation and fractionation section in a recycle gas amine contactor to form a first portion of a rich amine stream;
contacting a first portion of a lean amine stream with an acid liquefied petroleum gas (LPG) stream from a de-butanizer receiver vessel in the cold separation and fractionation section in a de-butanizer receiver amine contactor to form a second portion of a rich amine stream; and
contacting a third portion of a lean amine stream with a lean acid gas stream from a sponge absorber in the cold separation and fractionation section in a sponge absorber lean gas overhead amine contactor to form a third portion of a rich amine stream;
regenerating at least one of the first, second, and third portions of the rich amine stream in the common amine regenerator to form the lean amine stream and an overhead regenerator amine acid gas stream;
separating the overhead amine acid gas stream into the regenerator amine acid gas stream and a reflux liquid stream in an amine regenerator overhead condenser; and
refluxing the reflux liquid stream to the common amine regenerator.

5. The process of claim 3 further comprising:
separating a purge stream from an acid recycle gas stream from a cold separator in the cold separation and fractionation section in a pressure swing adsorption unit into a recycle hydrogen stream and a PSA tail gas stream, combining the recycle hydrogen stream with the acid recycle gas stream, and introducing the PSA tail gas stream into the thermal oxidation system as fuel;
contacting a second portion of a lean amine stream with an acid liquefied petroleum gas (LPG) stream from a de-butanizer receiver vessel in the cold separation and fractionation section in a de-butanizer receiver amine contactor to form a second portion of a rich amine stream; and
contacting a third portion of a lean amine stream with a lean acid gas stream from a sponge absorber in the cold separation and fractionation section in a sponge absorber lean gas overhead amine contactor to form a third portion of a rich amine stream;

regenerating at least one of the second and third portions of the rich amine stream in the common amine regenerator to form the lean amine stream and an overhead regenerator amine acid gas stream;
separating the overhead amine acid gas stream into the regenerator amine acid gas stream and a reflux liquid stream in an amine regenerator overhead condenser; and
refluxing the reflux liquid stream to the common amine regenerator.

6. The process of claim 1 further comprising
preheating the sour water stream before thermally oxidizing the sour water stream using steam from the process for producing renewable transportation fuel or from recovered heat from the waste heat recovery section.

7. The process of claim 1 further comprising:
introducing a renewable feedstock to a guard bed to remove contaminants comprising one or more of alkali metals, oxygen compounds, sulfur compounds, and nitrogen compounds from the renewable feedstock;
treating a renewable feedstock to remove additional oxygen compounds from the renewable feedstock;
contacting the renewable feedstock with a hydroisomerization catalyst, a hydrocracking catalyst, or both in the presence of hydrogen under hydroisomerization and hydrocracking conditions in a hydroisomerization and hydrocracking section to form a reaction effluent; and
separating and fractionating the reaction effluent in the cold separation and fractionation section to form at least one renewable transportation fuel.

8. The process of claim 7 wherein separating and fractionating the reaction effluent comprises:
separating the reactor effluent in a cold separator into a liquid hydrocarbon stream, a cold separator recycle acid gas stream, and a cold separator sour water stream;
stripping the liquid hydrocarbon stream into a stripper overhead stream and a stripper bottom stream;
separating the stripper overhead stream in a stripper receiver into a stripper receiver liquid stream, a stripper receiver off-gas stream, and a stripper receiver sour water stream;
contacting the stripper receiver off-gas stream with a sponge absorber forming a sponge absorber liquid stream and a lean acid gas stream;
separating the stripper receiver liquid stream and optionally the sponge absorber liquid stream in a de-butanizer column into de-butanizer overhead stream, a de-butanizer bottom stream;
separating the de-butanizer overhead stream in a de-butanizer receiver into an acid liquefied petroleum gas (LPG) stream, a de-butanizer receiver sour water stream, and a reflux stream; and
fractionating the stripper bottom stream into at least one of a renewable jet fuel stream, a renewable diesel fuel stream, and a naphtha stream.

9. The process of claim 8 wherein the sour water stream comprises at least one of the cold separator sour water stream, stripper receiver sour water stream, and the de-butanizer receiver sour water stream.

10. The process of claim 8 further comprising:
at least one of:
contacting a first portion of a lean amine stream with the cold separator acid recycle gas stream in a recycle gas amine contactor to form a first portion of a rich amine stream;
contacting a second portion of the lean amine stream with the acid LPG stream from the de-butanizer receiver in a de-butanizer receiver amine contactor to form a second portion of the rich amine stream; and contacting a third portion of the lean amine stream with the lean acid gas stream from the sponge absorber in a sponge absorber overhead amine contactor to form a third portion of the rich amine stream;

regenerating at least one of the first, second, and third portions of the rich amine stream in a common amine regenerator to form the lean amine stream and an overhead amine acid gas stream;

separating the overhead amine acid gas stream into the amine acid gas stream and a reflux liquid stream in an amine regenerator overhead condenser; and refluxing the reflux liquid stream to the common amine regenerator.

11. The process of claim 1 wherein quenching the flue gas stream comprises quenching the flue gas stream with at least one of: air, the quenched flue gas stream, the de-SOx outlet flue gas stream, the de-NOx outlet flue gas stream, the treated outlet flue gas stream, and water.

12. The process of claim 1 further comprising:
introducing an uncompressed pressure swing adsorption (PSA) tail gas stream from a PSA unit connected to a hydrogen production plant to the thermal oxidation system as a fuel source.

13. The process of claim 1 further comprising:
introducing a slip stream of a lean acid gas stream from a sponge absorber to the thermal oxidation system as a fuel source.

14. The process of claim 1 further comprising:
passing the sour water stream through a first side of a primary heat exchanger;

passing an exhaust vapor stream from the thermal oxidation system through a second side of the primary heat exchanger, wherein the exhaust vapor stream comprises the treated outlet flue gas stream, the de-NOx outlet flue gas stream, or the de-SOX outlet flue gas stream;

transferring heat from the exhaust vapor stream to the sour water stream, cooling the exhaust vapor stream forming a cooled exhaust vapor stream and heating the sour water stream forming a heated sour water stream;

reducing a pressure of the heated sour water stream;

passing the reduced pressure heated sour water stream to a flash tank having a pressure lower than a pressure in the primary heat exchanger, forming a vapor stream and a liquid stream;

passing the vapor stream and the liquid stream to the thermal oxidizing section of the thermal oxidation system; and passing the cooled exhaust stream to an exhaust stack.

15. The process of claim 14 further comprising:
passing a process stream through a first side of a secondary heat exchanger, wherein the process stream is at least one of a combustion air stream and a boiler feed water or oil stream;

passing the exhaust vapor stream to a second side of the secondary heat exchanger before passing the exhaust vapor stream to the primary heat exchanger to reduce a temperature of the exhaust vapor stream and to heat the at least one process stream and form a second cooled exhaust vapor stream and at least one of a heated combustion air stream, and a heated boiler feed water or oil stream;

passing the second cooled exhaust vapor stream to the primary heat exchanger and wherein passing the exhaust vapor stream from the thermal oxidation system through the second side of the primary heat exchanger comprises passing the second cooled exhaust vapor stream through a second side of the primary heat exchanger; and at least one of:
passing the heated combustion air stream to the thermal oxidizing section of the thermal oxidation system; and passing the heated boiler feed water or oil stream to the waste heat recovery section.

16. The process of claim 14 further comprising:
introducing the sour water stream to the flash tank forming a liquid and a vapor before passing the sour water stream to the primary heat exchanger; and compressing at least a portion of the liquid;

wherein passing the sour water stream through the first side of the primary heat exchanger comprises passing the portion of the compressed liquid from the flash tank to the primary heat exchanger;

wherein reducing the pressure of the heated sour water stream comprises reducing the pressure of the heated compressed liquid from the primary heat exchanger; and wherein passing the reduced pressure heated sour water stream to the flash tank comprises passing the reduced pressure heated compressed liquid to the flash tank.

17. The process of claim 14 wherein the exhaust vapor stream is cooled in the primary heat exchanger to a temperature at or below a dew point to condense water from the exhaust vapor stream, forming a first condensate stream.

18. The process of claim 14 further comprising:
passing the first condensate stream to the quench section.

19. The process of claim 14 wherein the cooled exhaust vapor stream is passed to a third heat exchanger before being passed to the exhaust stack, and wherein the cooled exhaust vapor stream is further cooled in the third heat exchanger to a temperature at or below a dew point to condense water from the cooled exhaust vapor stream, forming a second condensate stream.

20. The process of claim 19 further comprising:
passing the second condensate stream to the quench section.

* * * * *